(12) United States Patent
Routson et al.

(10) Patent No.: US 9,324,087 B2
(45) Date of Patent: Apr. 26, 2016

(54) METHOD, SYSTEM, AND COMPUTER PROGRAM PRODUCT FOR LINKING CUSTOMER INFORMATION

(71) Applicant: III Holdings 1, LLC, Wilmington, DE (US)

(72) Inventors: Nicholas K. Routson, Phoenix, AZ (US); Mary Weissman, Mesa, AZ (US); Ann Shelley Mata, Davie, FL (US)

(73) Assignee: III Holdings 1, LLC, Wilmington, DE (US)

( * ) Notice: Subject to any disclaimer, the term of this patent is extended or adjusted under 35 U.S.C. 154(b) by 0 days.

(21) Appl. No.: 13/644,462

(22) Filed: Oct. 4, 2012

(65) Prior Publication Data

US 2013/0031109 A1    Jan. 31, 2013

Related U.S. Application Data

(63) Continuation of application No. 11/529,604, filed on Sep. 29, 2006, now Pat. No. 8,306,986.

(60) Provisional application No. 60/722,038, filed on Sep. 30, 2005.

(51) Int. Cl.
*G06F 7/00* (2006.01)
*G06F 17/30* (2006.01)
*G06Q 30/02* (2012.01)
*G06Q 50/26* (2012.01)

(52) U.S. Cl.
CPC .............. *G06Q 30/02* (2013.01); *G06Q 50/265* (2013.01)

(58) Field of Classification Search
CPC .......... G06F 17/30867; G06F 17/3053; G06F 17/30864; G06F 17/30038; G06F 17/30
See application file for complete search history.

(56) References Cited

U.S. PATENT DOCUMENTS

| | | | |
|---|---|---|---|
| 5,659,731 A | | 8/1997 | Gustafson |
| 5,819,263 A | * | 10/1998 | Bromley et al. |
| 5,920,629 A | * | 7/1999 | Rosen .............................. 705/69 |
| 5,966,695 A | | 10/1999 | Melchione et al. |

(Continued)

OTHER PUBLICATIONS

USPTO; Office Action dated Mar. 1, 2013 in U.S. Appl. No. 11/755,313.

(Continued)

*Primary Examiner* — Hosain Alam
*Assistant Examiner* — Nicholas Allen
(74) *Attorney, Agent, or Firm* — Meyertons, Hood, Kivlin, Kowert & Goetzel, P.C.

(57) ABSTRACT

In a business where a database tracks customers and manages customer accounts, a method and system correctly link accounts with customers. The method entails reading customer information for a first customer and for a second customer, and then utilizing personal identification information obtained from other sources to determine if the first customer is the same as the second customer. If the first customer and the second customer are the same person, the first customer and the second customer are identified as being the same unique person. Accounts associated with the two customers are identified as belonging to the same unique person. Viewed another way, the method and system of the present invention takes an existing database of personal identification information, and cross-references that database against other sources of personal identification information to identify persons who appear to be separate persons, but who are actually one and the same individual.

20 Claims, 18 Drawing Sheets

(56) References Cited

U.S. PATENT DOCUMENTS

| | | | |
|---|---|---|---|
| 5,995,946 A | 11/1999 | Auzenne et al. | |
| 6,049,797 A * | 4/2000 | Guha et al. | |
| 6,112,181 A * | 8/2000 | Shear et al. | 705/7.29 |
| 6,119,104 A * | 9/2000 | Brumbelow et al. | 705/35 |
| 6,128,602 A * | 10/2000 | Northington et al. | 705/35 |
| 6,163,774 A * | 12/2000 | Lore et al. | 705/36 R |
| 6,185,569 B1 * | 2/2001 | East et al. | |
| 6,449,618 B1 * | 9/2002 | Blott et al. | |
| 6,483,808 B1 * | 11/2002 | Rochberger et al. | 370/238 |
| 6,523,019 B1 | 2/2003 | Borthwick | |
| 6,711,565 B1 * | 3/2004 | Subramaniam et al. | |
| 6,789,189 B2 * | 9/2004 | Wheeler et al. | 713/156 |
| 6,804,667 B1 * | 10/2004 | Martin | 707/754 |
| 6,836,773 B2 * | 12/2004 | Tamayo et al. | |
| 6,871,220 B1 * | 3/2005 | Rajan et al. | 709/218 |
| 6,985,879 B2 | 1/2006 | Walker et al. | |
| 7,043,476 B2 | 5/2006 | Robson | |
| 7,069,264 B2 | 6/2006 | Anjur et al. | |
| 7,376,680 B1 | 5/2008 | Kettler et al. | |
| 7,490,059 B2 | 2/2009 | Albee et al. | |
| 7,562,067 B2 | 7/2009 | Chaudhuri et al. | |
| 7,725,421 B1 | 5/2010 | Gedalius et al. | |
| 7,840,571 B2 | 11/2010 | Forman et al. | |
| 2001/0051907 A1 * | 12/2001 | Kumar et al. | 705/36 |
| 2002/0013850 A1 * | 1/2002 | Mitchell et al. | 709/229 |
| 2002/0023217 A1 | 2/2002 | Wheeler et al. | |
| 2002/0059174 A1 * | 5/2002 | Shapiro | 707/1 |
| 2002/0059187 A1 | 5/2002 | Delo et al. | |
| 2002/0072927 A1 | 6/2002 | Phelan et al. | |
| 2002/0095386 A1 * | 7/2002 | Maritzen et al. | 705/64 |
| 2002/0188522 A1 * | 12/2002 | McCall et al. | 705/26 |
| 2003/0023531 A1 | 1/2003 | Fergusson | |
| 2003/0074342 A1 * | 4/2003 | Curtis | 707/1 |
| 2003/0074343 A1 | 4/2003 | Onuki | |
| 2003/0084024 A1 | 5/2003 | Christensen et al. | |
| 2003/0101136 A1 * | 5/2003 | Wheeler et al. | 705/42 |
| 2003/0172039 A1 * | 9/2003 | Guy et al. | 705/68 |
| 2003/0191703 A1 | 10/2003 | Chen et al. | |
| 2003/0204460 A1 * | 10/2003 | Robinson et al. | 705/35 |
| 2003/0225688 A1 * | 12/2003 | Dobbins | 705/39 |
| 2003/0229561 A1 * | 12/2003 | Wallman | 705/36 |
| 2003/0233287 A1 * | 12/2003 | Sadler et al. | 705/28 |
| 2004/0039630 A1 * | 2/2004 | Begole et al. | 705/11 |
| 2004/0073520 A1 * | 4/2004 | Eskandari | 705/400 |
| 2004/0098337 A1 * | 5/2004 | Gudgeon et al. | 705/36 |
| 2004/0107202 A1 * | 6/2004 | Burdick et al. | 707/101 |
| 2004/0122736 A1 * | 6/2004 | Strock et al. | 705/14 |
| 2004/0177018 A1 * | 9/2004 | Fenger et al. | 705/35 |
| 2004/0181453 A1 * | 9/2004 | Ray et al. | 705/16 |
| 2004/0204958 A1 | 10/2004 | Perkins et al. | |
| 2004/0205011 A1 * | 10/2004 | Northington et al. | 705/35 |
| 2004/0211830 A1 * | 10/2004 | Algiene | 235/379 |
| 2004/0220865 A1 * | 11/2004 | Lozowski et al. | 705/35 |
| 2004/0220918 A1 | 11/2004 | Scriffignano et al. | |
| 2004/0236653 A1 * | 11/2004 | Sokolic et al. | 705/35 |
| 2005/0010571 A1 * | 1/2005 | Solotorevsky et al. | 707/5 |
| 2005/0027648 A1 * | 2/2005 | Knowles et al. | 705/38 |
| 2005/0060332 A1 | 3/2005 | Bernstein et al. | |
| 2005/0108631 A1 | 5/2005 | Amorin et al. | |
| 2005/0147225 A1 | 7/2005 | Mallick et al. | |
| 2005/0149527 A1 | 7/2005 | Berlin et al. | |
| 2005/0154664 A1 | 7/2005 | Guy et al. | |
| 2005/0187938 A1 * | 8/2005 | Grear et al. | 707/9 |
| 2005/0211765 A1 * | 9/2005 | Brown et al. | 235/379 |
| 2005/0262044 A1 | 11/2005 | Chaudhuri et al. | |
| 2006/0036543 A1 | 2/2006 | Blagg et al. | |
| 2006/0059225 A1 * | 3/2006 | Stonehocker et al. | 709/202 |
| 2006/0080281 A1 | 4/2006 | Bongiorno et al. | |
| 2006/0085361 A1 | 4/2006 | Hoerle et al. | |
| 2006/0179050 A1 | 8/2006 | Giang et al. | |
| 2006/0238919 A1 | 10/2006 | Bradley | |
| 2006/0271568 A1 | 11/2006 | Balkir et al. | |
| 2006/0282429 A1 | 12/2006 | Hernandez-Sherrington et al. | |
| 2007/0011057 A1 * | 1/2007 | Archer et al. | 705/26 |
| 2007/0016616 A1 | 1/2007 | Brill et al. | |
| 2007/0100856 A1 | 5/2007 | Ebbesen | |
| 2007/0179776 A1 * | 8/2007 | Segond et al. | 704/9 |
| 2007/0185776 A1 * | 8/2007 | Nguyen et al. | 705/26 |
| 2007/0192122 A1 * | 8/2007 | Routson et al. | 705/1 |
| 2007/0208787 A1 | 9/2007 | Cheng et al. | |
| 2008/0005021 A1 * | 1/2008 | Brown et al. | 705/40 |
| 2008/0154541 A1 | 6/2008 | Gemulla et al. | |
| 2008/0208735 A1 | 8/2008 | Balet et al. | |
| 2008/0222207 A1 | 9/2008 | Ito | |
| 2008/0281786 A1 * | 11/2008 | Duffy et al. | 707/3 |
| 2008/0301016 A1 | 12/2008 | Durvasula et al. | |
| 2009/0043701 A1 * | 2/2009 | Elterich | 705/40 |
| 2009/0070289 A1 | 3/2009 | Churi et al. | |
| 2012/0030216 A1 | 2/2012 | Churi et al. | |

OTHER PUBLICATIONS

USPTO; Office Action dated Mar. 12, 2013 in U.S. Appl. No. 13/251,933.

USPTO; Preinterview First Office Action dated Oct. 2, 2008 in U.S. Appl. No. 11/529,604.

USPTO; Office Action dated Nov. 21, 2008 in U.S. Appl. No. 11/529,604.

USPTO; Office Action dated Mar. 23, 2009 in U.S. Appl. No. 11/529,604.

USPTO; Final Office Action dated Oct. 13, 2009 in U.S. Appl. No. 11/529,604.

USPTO; Advisory Action dared Jan. 26, 2010 in U.S. Appl. No. 11/529,604.

USPTO; Office Action dated Mar. 8, 2011 in U.S. Appl. No. 11/529,604.

USPTO; Final Office Action dated Aug. 17, 2011 in U.S. Appl. No. 11/529,604.

USPTO; Advisory Action dated Oct. 24, 2011 in U.S. Appl. No. 11/529,604.

USPTO; Office Action dated Dec. 7, 2011 in U.S. Appl. No. 11/529,604.

USPTO; Final Office Action dated Mar. 16, 2012 in U.S. Appl. No. 11/529,604.

USPTO; Advisory Action dated May 22, 2012 in U.S. Appl. No. 11/529,604.

USPTO; Notice of Allowance dated Jul. 17, 2012 in U.S. Appl. No. 11/529,604.

USPTO; Office Action dated Dec. 11, 2008 in U.S. Appl. No. 11/677,906.

USPTO; Office Action dated Jun. 11, 2009 in U.S. Appl. No. 11/677,906.

USPTO; Final Office Action dated Jan. 7, 2010 in U.S. Appl. No. 11/677,906.

USPTO; Advisory Action dated Mar. 5, 2010 in U.S. Appl. No. 11/677,906.

USPTO; Office Action dated Apr. 1, 2010 in U.S. Appl. No. 11/677,906.

USPTO; Final Office Action dated Aug. 26, 2010 in U.S. Appl. No. 11/677,906.

USPTO; Advisory Action dated Nov. 12, 2010 in U.S. Appl. No. 11/677,906.

USPTO; Office Action dated Jun. 9, 2011 in U.S. Appl. No. 11/677,906.

USPTO; Final Office Action dated Nov. 18, 2011 in U.S. Appl. No. 11/677,906.

USPTO; Advisory Action dated Feb. 10, 2012 in U.S. Appl. No. 11/677,906.

USPTO; Office Action dated Jul. 8, 2009 in U.S. Appl. No. 11/755,313.

USPTO; Final Office Action dated Jan. 8, 2010 in U.S. Appl. No. 11/755,313.

USPTO; Advisory Action dated Mar. 1, 2010 in U.S. Appl. No. 11/755,313.

USPTO; Office Action dated Oct. 6, 2009 in U.S. Appl. No. 11/854,259.

USPTO; Office Action dated Mar. 10, 2010 in U.S. Appl. No. 11/854,259.

(56) References Cited

OTHER PUBLICATIONS

USPTO; Final Office Action dated Aug. 19, 2010 in U.S. Appl. No. 11/854,259.
USPTO; Advisory Action dated Oct. 20, 2010 in U.S. Appl. No. 11/854,259.
USPTO; Office Action dated Dec. 27, 2010 in U.S. Appl. No. 11/854,259.
USPTO; Final Office Action dated May 27, 2011 in U.S. Appl. No. 11/854,259.
USPTO; Advisory Action dated Jul. 28, 2011 in U.S. Appl. No. 11/854,259.
USPTO; Office Action dated Oct. 11, 2011 in U.S. Appl. No. 11/854,259.
USPTO; Notice of Allowance dated Dec. 21, 2011 in U.S. Appl. No. 11/854,259.
USPTO; Office Action dated Jan. 19, 2010 in U.S. Appl. No. 11/867,640.
USPTO; Final Office Action dated Nov. 16, 2010 in U.S. Appl. No. 11/867,640.
USPTO; Advisory Action dated Jan. 26, 2011 in U.S. Appl. No. 11/867,640.
USPTO; Office Action dated Feb. 25, 2011 in U.S. Appl. No. 11/867,640.
USPTO; Office Action dated Jul. 1, 2011 in U.S. Appl. No. 11/867,640.
PCT; International Search Report and Written Opinion dated May 28, 2008 in Application No. PCT/US2008/06711.
PCT; International Preliminary Report on Patentability dated Dec. 1, 2009 in Application No. PCT/US2008/06711.
USPTO; Notice of Allowance dated May 8, 2013 in U.S. Appl. No. 11/755,933.
USPTO; Office Action dated Jun. 12, 2013 in U.S. Appl. No. 11/677,906.
USPTO; Final Office Action dated Aug. 30, 2013 in U.S. Appl. No. 11/755,313.

\* cited by examiner

Illustration of Initial Rules

METHOD, SYSTEM, AND COMPUTER PROGRAM PRODUCT FOR LINKING CUSTOMER INFORMATION

CROSS REFERENCE TO RELATED APPLICATIONS

This application is a continuation of claims priority to and the benefit of, U.S. Ser. No. 11/529,604 filed Sep. 29, 2006 and entitled "METHOD, SYSTEM, AND COMPUTER PROGRAM PRODUCT FOR LINKING CUSTOMER INFORMATION." The '604 application claims priority to, and the benefit of U.S. Provisional Patent Application Ser. No. 60/722,038, filed Sep. 30, 2005. Both of which are hereby incorporated by reference in their entirety.

BACKGROUND OF THE INVENTION

1. Field of the Invention

The present invention generally relates to managing customer information within a database, and more particularly to ensuring that most or substantially all customer accounts are correctly linked to appropriate customer information within a customer database. The present invention further relates to ensuring that most or substantially all unique customers are not erroneously identified as two or more customers, but are instead correctly identified as being a single unique customer.

2. Related Art

Customers often have more than one account established through a business, especially with a service-oriented business such as a financial services company or an insurance business. In the case of the financial services industry, for example, a single customer may have any combination of a personal bank account, a mortgage, a line of credit (such as a home equity line of credit), a personal credit card, a business credit card, a rewards account, and one or more investment accounts with a single financial institution. In the insurance business, a single customer may have any combination of health insurance, auto insurance, home owners insurance, and other kinds of insurance protection as well. Even with non-service businesses, a single customer may have multiple accounts. For example, a single customer may have one account with a computer supply company for home purchases and another account with the same company for small business purchases.

It is important for a company to recognize that all of the customer's accounts belong to a single customer and to link those accounts, in order to appropriately market to the customer without overloading the customer. In addition, each customer may have preferences with respect to their privacy, and with respect to a variety of matters related to the management of their accounts. It is important for effective business-customer relations that these customer preferences be respected in relation to all accounts associated with the customer.

Further, ensuring that all accounts for a given customer are, in fact, accurately associated with that customer is vital for businesses which offer decision-support to their customers, as is the case, to name just one example, with a financial service business that provides portfolio and asset management. The correct linking of accounts with a customer can improve the accuracy of the financial company's estimate of the financial status of the customer.

In practice, accurately linking accounts with a single customer proves to be a non-trivial undertaking. It is possible to associate one or more accounts with a single customer based on unique customer identifying information, such as the customer name, social security number, date of birth, address, and other distinctive or unique identifiers. However, the association process is fallible. For example, sometimes some information is not collected; if a customer's business is applying for a credit card, for example, then a tax ID number may be collected rather than the customer's social security number.

It is also possible that variations may creep into the way a customer's name is recorded, or the way the address is recorded, or simply that errors are made during the process of collecting customer identifying data. People change addresses over time, or change their name, which can thwart efforts to make account associations based on the name, address, or other time-variant identification data. There are other factors as well which can contribute to a failure to correctly identify that two or more distinct accounts are actually associated with a single customer.

Still another factor which makes it difficult to effectively recognize which accounts are, in fact, associated with a single customer is the size of many businesses. A large service business, such as a large financial institution, may have multiple business units. Often, these business units do not efficiently or effectively share information, since in some cases data processing may be distributed over multiple computer systems and software systems. As a result customer information can be fragmented over these multiple data processing systems and their associated databases.

It is also possible that accounts can be incorrectly linked, i.e., that accounts which actually belong to two separate customers become associated, within the business database, with a single customer. This can happen through various errors in data association or the data association process, and can also occur as a result of deliberate fraud by third-parties, e.g., identity theft.

Still, it is essential that the linking of customer accounts be accurate, so that accounts from two different customers are not incorrectly linked and/or that accounts belonging to the same customer are not left unlinked.

Given the foregoing, what is needed is a method, system, and computer program product for linking customer information. In particular, what is needed is a method, system, and computer program product that provides a substantially complete and accurate view of product relationships for prospects and customers across all lines of business, products and services, no matter how large the company or business may be, and no matter how diverse the product lines or service lines. The method, system, and computer program product should ensure that there is no redundancy in customer identification, i.e., that one single, unique customer is not erroneously viewed within the company database system or systems as being multiple customers. What is further needed is a method, system, and computer program product to ensure that all customer accounts are correctly linked to the appropriate customers who own the accounts, without any erroneous linkages.

BRIEF SUMMARY OF THE INVENTION

The present invention meets the above-identified needs by providing a method, system, and computer program product for linking customer information. This method is referred to as the customer linking and identification capability (CLIC) method, or as the "CLIC method" in brief.

In one embodiment of the invention, the CLIC method comprises collecting internal customer account data into a consolidated database, and then searching one or more external databases for personal identification information which is related to customer account data, wherein the external databases are not part of the company's in-house repository of customer data. An analysis is performed to compare internal customer account data with the externally obtained personal identification information so as to determine which accounts, previously listed as belonging to separate customers, actually belong to the same customer. Linkages are then created between all accounts belonging to a single, unique customer.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The features and advantages of the present invention will become more apparent from the detailed description set forth below when taken in conjunction with the drawings in which like reference numbers indicate identical or functionally similar elements. Additionally, the left-most digit or digits of a reference number identifies the drawing in which the reference number first appears.

DETAILED DESCRIPTION OF THE INVENTION

I. Introduction

Figure 1:
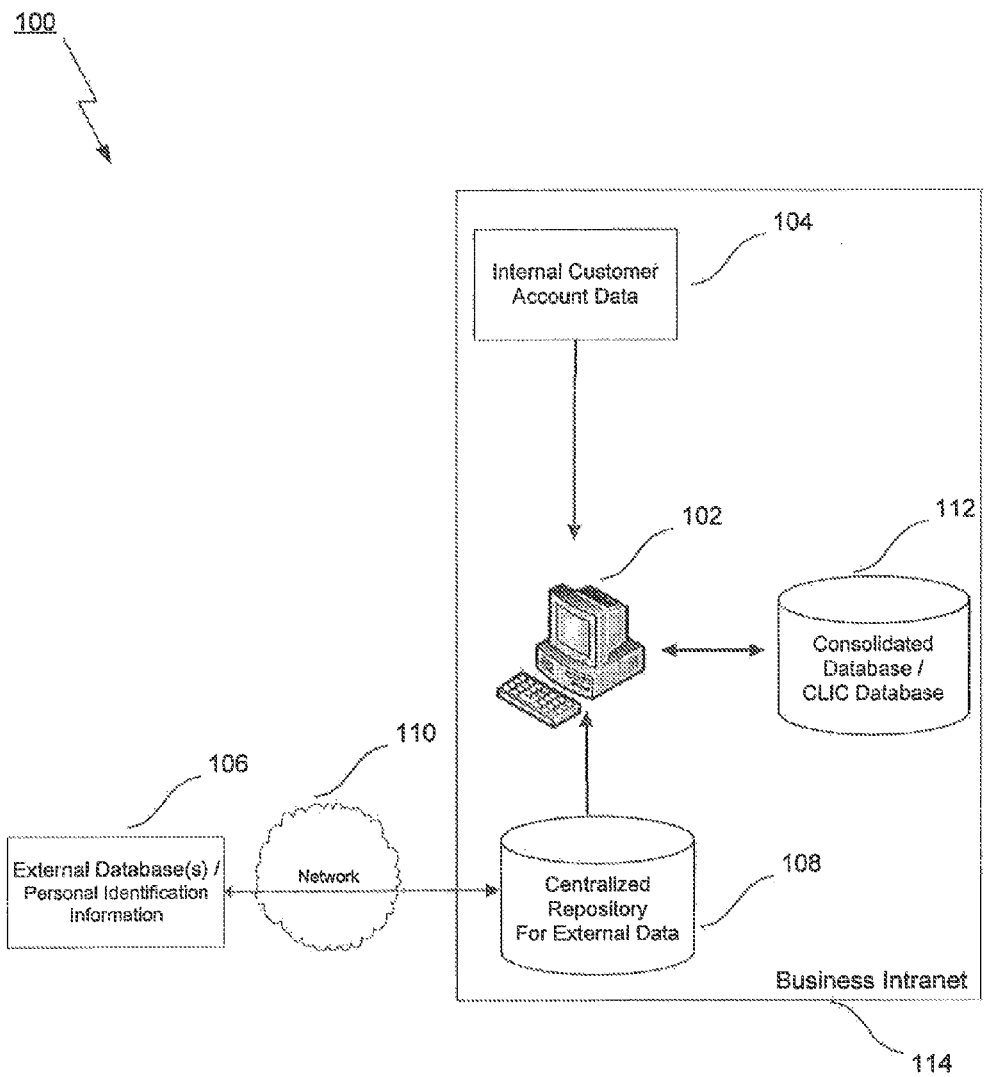
FIG. 1 is a system diagram of an exemplary business intranet environment and external network and database environment in which the present invention, in an embodiment, would be implemented.

The present invention is directed to a method, system, and computer program product for linking customer accounts with non-redundant client identifications, that is, for linking customer accounts with unique client identifications within a business or other organizational database. It should be understood that while the method, system, and computer program product are described here in the context of business enterprises, business activities, and customer and account databases implemented in a business context, the method, system, and computer program product could as well be implemented and applied in other contexts as well.

For example, the method, system, and computer program product described herein could be used to link records of a non-commercial nature which are related to a common, unique person described in a database implemented in a non-commercial and non-business context. Additionally, the method, system, and computer program product described herein could be used to identify as one unique person a set of data records, previously identified as belonging to separate persons, in a non-business or non-commercial database or set of databases.

For example, the method described in this invention could have applications in law enforcement in identifying persons who are listed in different states or different municipalities as being different persons but are in fact the same person, or it could be employed to identify individuals who have attended different schools or have been employed in various jobs who are in fact the same persons.

The present invention is referred to variously as the "method, system, and computer program product for linking customer information", the "customer linking and identification capability method", the "customer linking and identification capability system", the "customer linking and identification capability process", the "customer linking and identification capability computer program product", the "CLIC method", the "CLIC process", the "CLIC computer program product", or the "CLIC system", and these terms are used interchangeably throughout this document.

The present invention is now described in more detail herein in terms of an exemplary business context, and typically in the context of a financial business. This is for convenience only and is not intended to limit the application of the present invention. In fact, after reading the following description, it will be apparent to one skilled in the relevant art(s) how to implement the following invention in alternative embodiments, as indicated above. Thus, the description provided below is for purposes of illustration and explanation only, and should not be construed as limiting the scope of the invention. Rather, the scope of the invention is determined by the appended claims.

The terms "consumer", "customer", "client", "person", "individual", "prospect", and/or the plural form of these terms are used interchangeably throughout herein to refer to those persons or entities capable of accessing, using, being affected by, being listed in the one or more databases of purchasing the products of being clients of seeking the products and/or services of, being offered products and/or services of and/or subscribing to or benefiting from the products and/or services of the representative business unit, units, organization, or organizations which would implement and apply the method, system, and computer program product tool that the present invention provides for linking customer information.

Furthermore, the terms "business", "merchant", "organization", and/or "enterprise" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant, a financial institution or service provider, or the like. A business or organization as understood herein may include not only for-profit businesses, but also non-profit or not-for-profit organizations such as schools, and may even be construed to encompass governmental or semi-governmental agencies, including but not limited to the Post Office, law enforcement agencies, etc.

An "account" commonly refers to a set or collection of data which indicates transactions between a customer and a business which are typically bundled together under the name of a service of some kind, and/or a status or statuses of services which a business may provide to a consumer, and/or a set of one or more legal or financial obligations on the part of a business towards the consumer, and/or a set of one or more legal or financial obligations on the part of a consumer towards a business. For example, a loan account may record a customers credit line, as well as specific transactions wherein the customer has borrowed money against the loan account or paid back principle or interest on the account.

However, for purposes of this document, an "account" may also be understood to refer more broadly to any kind of collection of data which a business or organization may maintain in relation to a customer or other person associated with the business or organization. An example of an account, understood in this broader sense, might be a student's transcript of grades at an educational institutional. (The student may well have a second or third account at the same institution, related to tuition payments, financial aide, etc.)

An "account number", as used herein, and as sometimes also referred to simply as an "account", may include any device, code, number, letter, symbol, digital certificate, smart chip, digital signal, analog signal, biometric or other identifier/indicia suitably configured to allow a consumer to access, interact with or communicate with a financial transaction system or other transaction system. The account number may optionally be located on or associated with any financial transaction instrument (e.g., rewards, charge, credit, debit, prepaid, telephone, embossed, smart, magnetic stripe, bar code, transponder or radio frequency card).

A customer account number may be, for example, a sixteen-digit credit card number. Each credit card issuer has its own numbering system, such as the fifteen-digit numbering system used by American Express Company of New York, N.Y. A merchant account number may be, for example, any number or alpha-numeric characters that identifies a particular merchant for purposes of card acceptance, account reconciliation, reporting and the like.

A "generation code", sometimes called a "suffix", is a suffix to a name, which may be a full word such as "Senior" or "Junior" or similar, or an abbreviated appellation such as "Sr.", or "Jr." or similar, or may be a numeric designation such as "the Second", "the Third", "$2^{nd}$", "$3^{rd}$", or similar, which indicates lineage within a family, and is generally considered to be part of a person's full name.

II. Overview

Preexisting customer data from one or more accounts held with a business are input into a consolidated database. One or more external database(s) are searched for personal data which, based on matching and filter criteria, are candidate matches to the preexisting customer data in the consolidated database. The external candidate match data is consolidated into a centralized repository. The external candidate match data, now stored in the centralized repository, and the preexisting customer data are analyzed for matches according to a set of linking rules; the analysis process may entail a single pass through a single set of linking rules, or may entail two or more passes through different sets of linking rules, resulting in progressively more accurate matches.

A "match" indicates that a candidate from an external database is likely to be the same individual as an individual already identified in the consolidated database. Based on the matches found, linkage recommendations are made. Each recommendation suggests that a link be made between multiple accounts, sometimes for accounts previously associated with separate customers, so that the accounts will become associated with a single customer. Each such recommendation also suggests that several customers, previously considered to be separate customers, should be consolidated into one unique customer.

In a single-pass process, the recommendations are immediately implemented as linkages. In a two-or-more pass process, preliminary linkage recommendations are then analyzed and validated according to secondary linking rules, possibly tertiary linking rules, and possibly additional sets of linking rules, resulting in the links finally being established in the consolidated database.

The actual linkages may be established through various means, in one embodiment of the present invention, a persistent ID, unique to each customer, is used to associate all accounts for a single customer. Finally, when triggered by events such as customer requests or indications of errors in the database (such as indications of identity theft), manual linkages are made to correct for overlink or underlink errors.

An advantage of the present invention is that by importing externally obtained personal identification information, deficiencies (e.g., omissions and/or errors) in the existing in-house data are compensated for. As a result of the additional, externally obtained personal identification information, it is possible to recognize linkages among internal customer records in cases where existing internal customer data would be insufficient to establish those linkages, no matter how sophisticated might be the data processing algorithm employed to analyze the internal data alone.

Another advantage of the present invention is that it optionally employs a multistage analysis process to compare external personal identification data with internal data. As a result of this optional multistage analysis process, it is possible to create a robust customer linking process which employs both "off the shelf" or third-party data analysis/data matching software and algorithms in one stage of the process, and also custom-designed data analysis/data, matching software and algorithms in another stage. The custom-designed algorithms may be tuned or optimized for the particular database requirements and customer linking requirements of a particular business. The optional multistage processing also enables manual or automated error-checking and link validation at multiple stages in the customer linking process.

Another advantage of the present invention is that, by reducing or eliminating redundant customer identifications, and correctly linking multiple customer accounts with unique customers, the invention improves the ability of a business to offer integrated services and support to a customer by recognizing all aspects of the business in which the unique customer participates or subscribes.

III. System

FIG. 1 is a system diagram of an exemplary business data processing environment 100 in which the present invention, a customer linking and identification capability (CLIC) method, in an embodiment, would be implemented.

System 100 includes a business or organizational intranet 114, which in turn has a computer or server 102. Computer 102 is connected to a back-end consolidated database 112 and also to a centralized repository for external data 108. Computer 102 is also connected to one or more other data sources which represent sources of internal customer account data 104. This internal customer account data may be related to credit card accounts, banking accounts, investment accounts, or any number of other kinds of financial or commercial accounts which are owned by customers of the business. The account data includes both identification information about the accounts themselves, transaction related data such as the financial status of the account, and also information about the customer or customers who own the account.

The consolidated database 112 is also referred to as the customer linking and identification capability database 112 or the CLIC database 112, a reference to the CLIC method of the current invention. The terms "consolidated database" and "CLIC database" will be used interchangeably throughout the rest of this document.

In addition to being connected to the internal customer account data 104, which may be stored on one or possibly more servers throughout the business institution which is implementing the CLIC method, and/or throughout affiliates of the business institution which is implementing the CLIC method, computer 102 is also connected to a source of information about personal identification information. In the embodiment illustrated in FIG. 1, the personal identification information is available on one or more external database(s) 106 which can be accessed through a network 110. In a typical embodiment the external database(s) 106 are external to the financial or other business institution, and network 110 represents access through the Internet or through other networks.

Computer 102 will obtain personal identification information from external database(s) 106 through network 110, and will store the personal identification information in centralized repository for external data 108. Centralized repository for external data 108 may be a separate database from consolidated database 112. Centralized repository for external data 108 may also be a table or other data storage structure or file within consolidated database 112, wherein those tables or other data storage structures or files are set aside as repositories for data obtained from external database(s) 106. The centralized repository for external data 108 may take other forms, including but not limited to a large storage cache within the random access memory or other memory within computer or server 102. The exact details of this architecture are not essential to the operations of this invention.

IV. Process

Figure 2A:
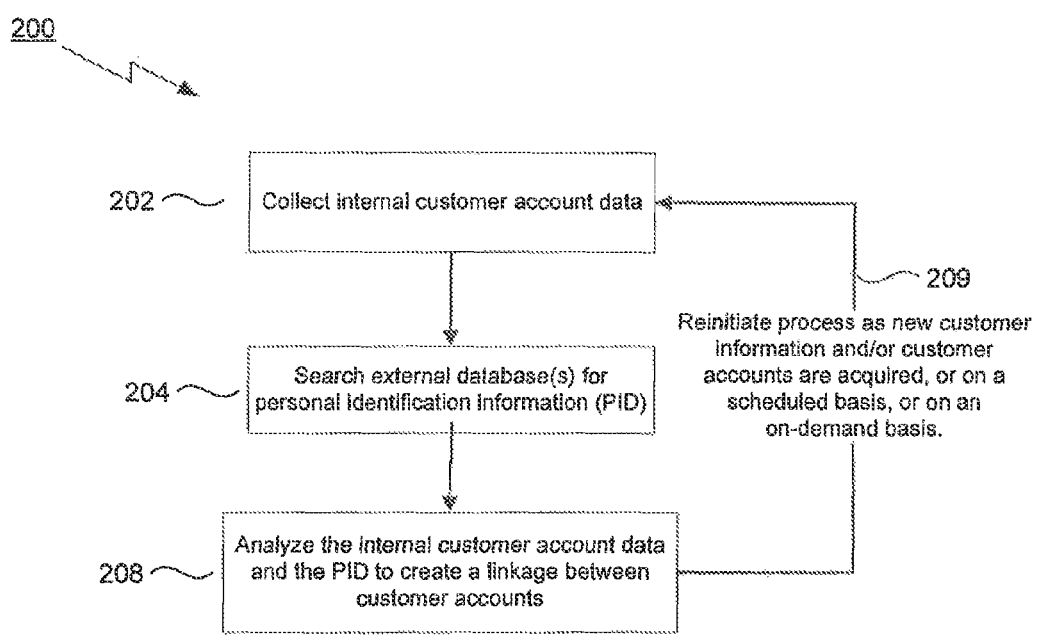
FIG. 2A is a flowchart illustrating a customer linking and identification capability (CLIC) process according to one embodiment of the present invention.

FIG. 2A is a flowchart illustrating a customer linking and identification capability (CLIC) method 200 according to one embodiment of the present invention.

The method begins with step 202, wherein the method collects internal customer account data. As previously indicated, this data can represent a wide variety of accounts from multiple business units within a business such as a financial institution. These accounts can be banking accounts, savings accounts, credit card accounts, investment accounts, mortgage accounts, and other such accounts. In one embodiment of the invention, the collected internal customer account data is stored in consolidated database 112.

Consolidated database 112 may take the form of a table or system of tables on a single database server or even on a single disk. However, with current capabilities in distributed processing and distributed technologies, a consolidated database can actually be a system of distributed databases spread over several servers, or possibly even over several networks, provided that the software that is used to manage the consolidated database 112 is capable of treating the physically distributed database as one logically consolidated database for processing purposes.

In step 204, databases are searched for personal identification (PID) information, and in one embodiment the search is for PID to be found in external database(s) 106. In step 208, method 200 analyzes the internal customer account data and also analyzes the external PID to create a linkage between customer accounts. The details of all these steps are discussed further below. In step 209 the entire process may be reinitiated by returning to step 202 based on a variety of criteria or trigger events including, for example and without limitation, on a scheduled basis, on an on-demand basis, that is, when the process is initiated by a database manager or other staff member of the business, or as it is determined that one or more business units have collected new customer account information.

Figure 2B:
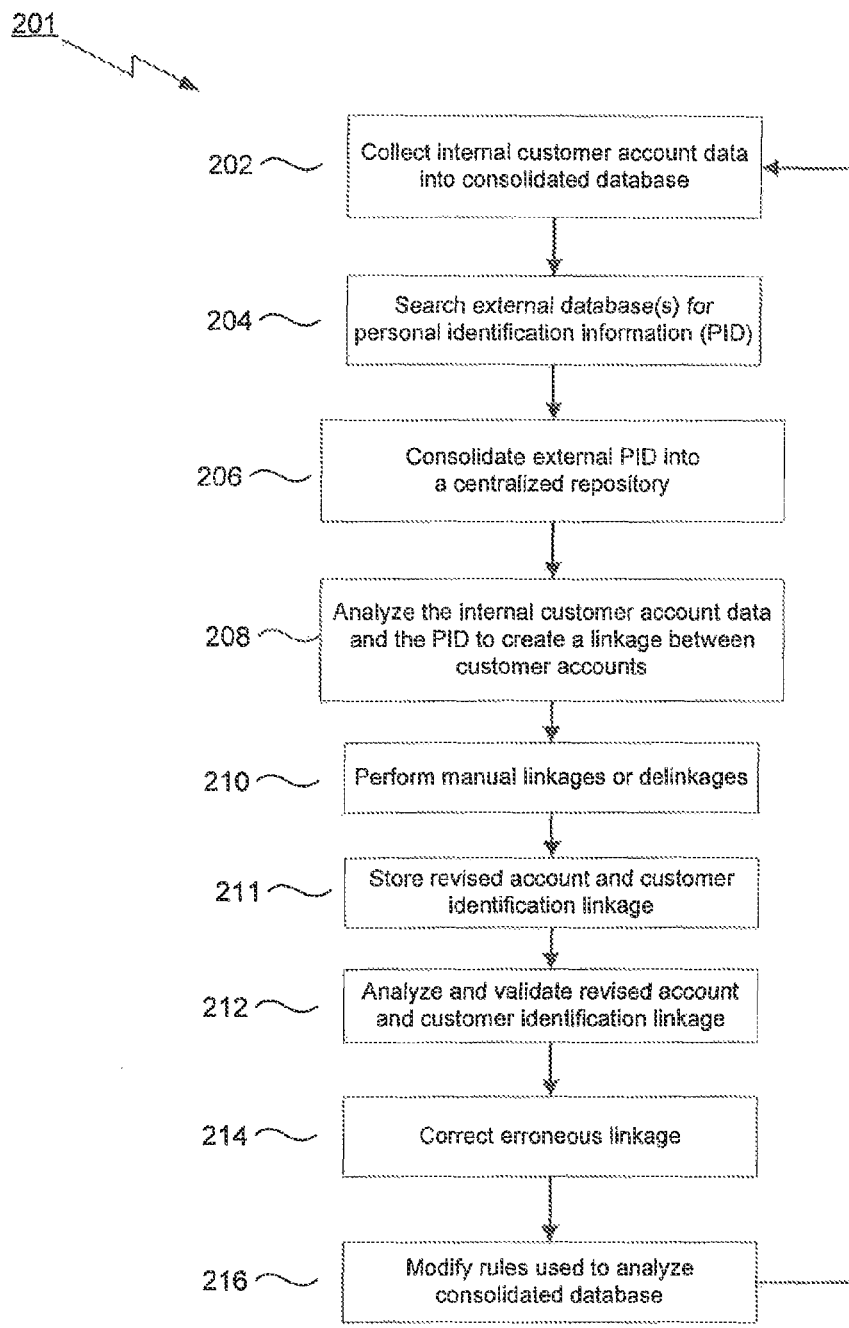
FIG. 2B is a flowchart illustrating a CLIC process according to an enhanced version of the embodiment of the present invention illustrated in FIG. 2A, showing additional steps which may be advantageous to perform.

FIG. 2B is a flowchart illustrating a CLIC process according to an enhanced version 201 of the embodiment of the invention illustrated in FIG. 2A, showing additional steps which may be advantageous to perform.

As before, step 202 represents collecting internal customer account data, wherein the internal customer account data is collected into consolidated database 112. In step 204 there is again a search for PID information, wherein the search for PID information is conducted by searching external database(s) 106.

In one embodiment of the present invention step 206 entails consolidating the external PID into a centralized repository for external data 108. This consolidation of the external PID into centralized repository 108, while not essential to the present invention, may facilitate effective processing of the external PID data 106 which is being used to analyze internal customer account data 104.

In an alternative embodiment of the present invention, rather than consolidating external PID information 106 into a centralized repository for external data 108, external PID data 106 may be evaluated dynamically as it is accessed to determine if it is a potential candidate match to internal customer account data 104. This process of dynamic, real-time evaluation, wherein some of the external PID data 106 is temporarily retained for further immediate processing, is known as "netting down." External PID data 106 which is determined, via the netting down process, to be a potential match to internal customer account data 104 is retained in temporary storage, such as RAM or some other short-term database, and then may be immediately compared in more detail to internal customer account data 104 as described in the following steps. This detailed comparison may occur in parallel with an ongoing search of other sources of external PID data 106 for potential candidate matches.

The method, system, and computer program product for linking customer information will be described in the remainder of this document as using the centralized repository for external data 108 as a means for storing external PID data, but this is for purposes of illustration only; persons skilled in the relevant art(s) will appreciate that the method, system, and computer program product of the present invention may equally well be implemented utilizing the netting down process as described here, i.e., a process of dynamically accessing and evaluating external PID data 106 in real-time, immediately prior to and/or in parallel with comparing that data in further detail against internal customer account data 104.

Step 208, as before, entails the analysis of the internal customer account data 104 and the external PID 106 to create a linkage between customer accounts. Step 210 entails performing manual linkages or delinkages. Manual linkages or delinkages typically arise when customers call in and, in the course of conversations with customer service representatives, provide information which indicates that some of their accounts which have previously been separate should be linked together; or, on the other hand, when the customers call in and indicate a problem which indicates that two accounts which are linked to that customer should not both be linked to that customer. In this case, the customer service representative, using a standard interface (not shown), is able to manually link or delink accounts from the customer.

Step 211 entails storing the revised customer and account linkages. Step 212 entails a further analysis and validation of the revised account and customer identification linkages. This further analysis and validation can be performed manually by a designated database manager whose job is to maintain the integrity of the CLIC database 112. There may also be automated systems which can perform a review and screening of the data to identify errors.

Step 214 entails correcting erroneous linkages. Step 216 entails modifying the rules used to analyze the consolidated database 112. The rules are modified based on the identified errors and corrections that are made, such that the same types of errors or similar types of errors will not occur again.

The entire process may be repeated starting with step 202 based on a variety of criteria or trigger events, including for example and without limitation on a scheduled basis, on an on demand basis, that is, when the process is initiated by a database manager or other staff member of the business, or as it is determined that one or more business units have collected new customer account information.

Figure 3:
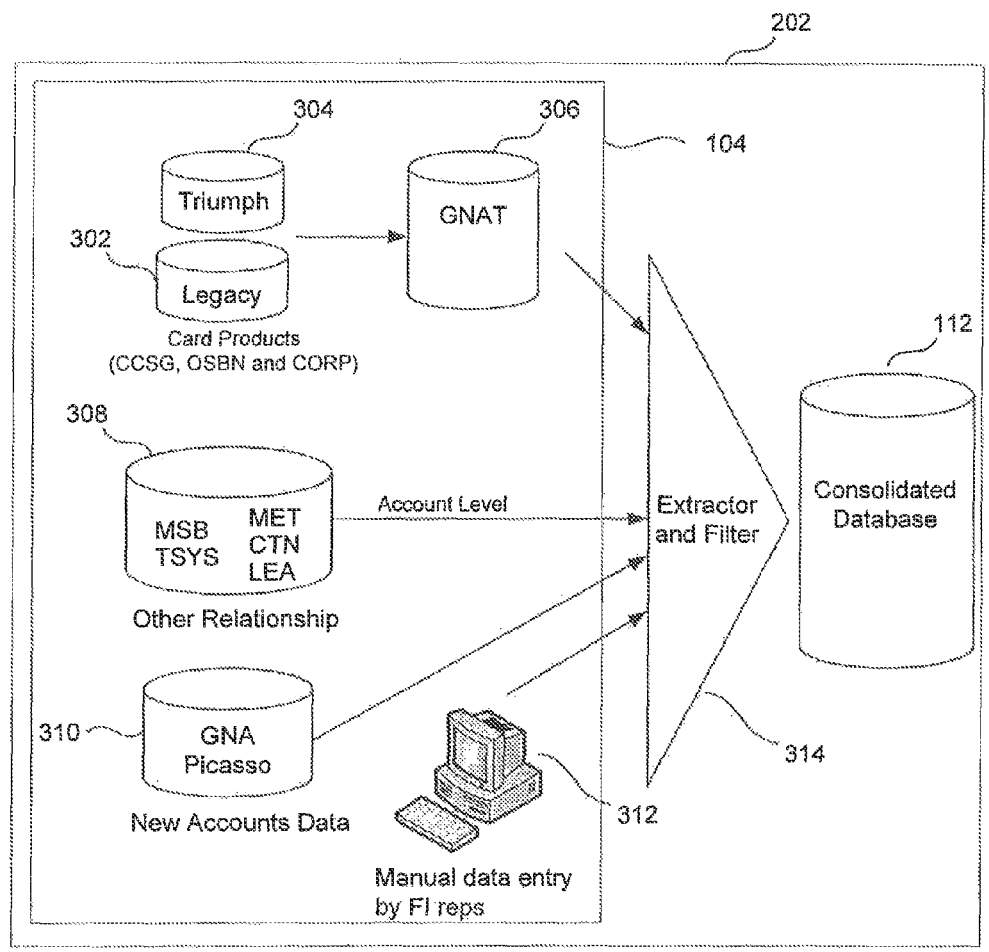
FIG. 3 is a system diagram illustrating possible sources of internal customer account data at a representative business, and further illustrating the consolidation and filtering of that data into the consolidated database.

FIG. 3 provides an example of the flow of information which is involved in implementing step 202 of the CLIC method. Step 202 entails collecting internal customer account data into a consolidated database 112. As illustrated in FIG. 3 there can be a variety of sources of internal customer data.

The example data shown here includes a variety of sources of data which would be used by one example financial institution, the American Express Company. The Legacy 302 and Triumph 304 databases hold accounts receivable data for various types of consumer, small business, and larger business credit cards (CCSG, OSBN, and CORP, respectively). These are all consolidated into a global new accounts table (GNAT) database 306. Databases for other customer relationships 308 include membership banking (MSB), investment account relationships (INVST), portfolios acquired from other banks (TSYS), consumer and business loan accounts (MET), consumer travel network transactions (CTN), and equipment leasing accounts (LEA). There are also databases for consumer and small business applications for new accounts 310 (GNA and Picasso, respectively). Finally, there is manual data entry by financial institution representatives 312.

The sample sources of data shown are purely for purposes of illustration, and it would be clear to one skilled in the relevant art(s) that other organizations, businesses, and business units would have their own, business-appropriate or organization-appropriate sources of customer and account data. Together these sources comprise the internal customer account data 104.

In step 202, all of the internal customer account data 104 is taken in and processed via an extractor and filter 314. The extractor and filter 314 has a set of rules or criteria which selects and extracts the PID information that may be used for establishing customer and account linkages, while screening out filtering out) any data which is not necessary for creating those linkages. The filtered data, with pertinent account owner information, is then stored in the CLIC database 112.

In one embodiment of the present invention, for example, transaction data would not be necessary. In other words, data regarding specific sales, specific purchases, and related transaction data would not be necessary for establishing linkages between customers and accounts. Similarly, any data regarding customer preferences, e.g., preferences as to marketing campaigns they wish to receive, or how they wish their privacy to be handled, would also not be pertinent to the current method and would be filtered out by extractor and filter 314.

As another example of the filtering process, persons who may be associated with an account but are not owners of the account would also be filtered out via extractor and filter 314. For example, in a credit card account, there may be several people known as "authorized agents" or "authorized managers", who have the right to use the credit card but are not account owners. Extractor and filter 314 would screen out authorized agents or authorized managers. In an alternative embodiment of the present invention, those persons who are filtered out, e.g., the authorized agents or authorized managers, may be assigned their own unique persistent ID which would be stored in the CLIC database, and which would then be available for later processing if other accounts become associated with those persons.

Figure 4:
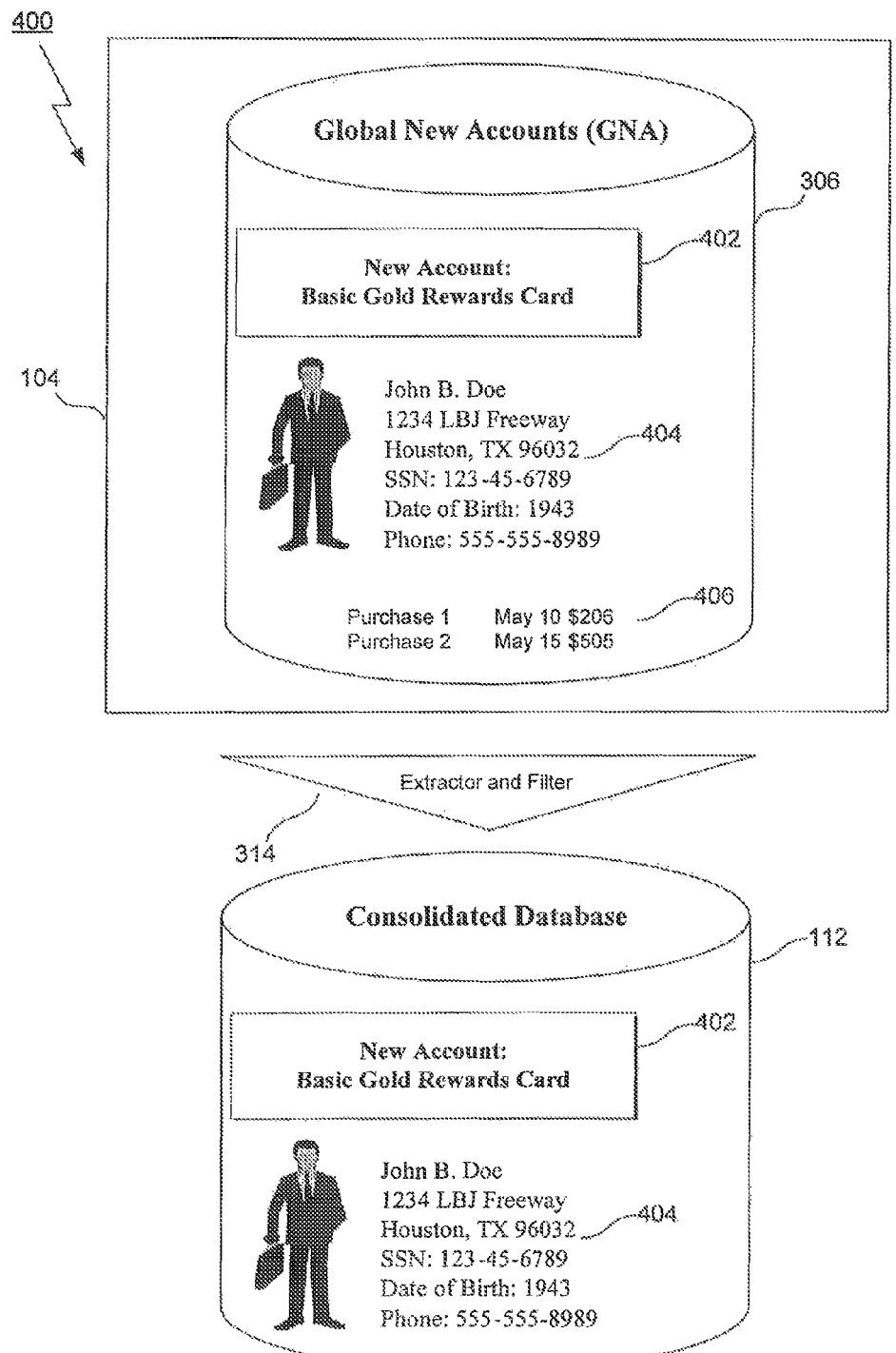
FIG. 4 is an example of representative customer account data being imported into the consolidated database.

FIG. 4 provides an example 400 of the method by which extractor and filter 314 extracts data from internal customer account data 104 and places the data in CLIC database 112. In the example shown, the source of data is the GNA database 306. Among the data stored in the GNA database 306 is an account 402 for a Basic Gold Rewards card account for a customer 404 John B. Doe. Included in the account data is a list of purchase activity 406. When the data is filtered through extractor and filter 314, the account information 402 survives the filtering process and is stored in the CLIC database 112 along with the customer information 404 for John B. Doe.

However, the transaction history or purchase history 406 has been removed during the filtering process.

Figure 5A:
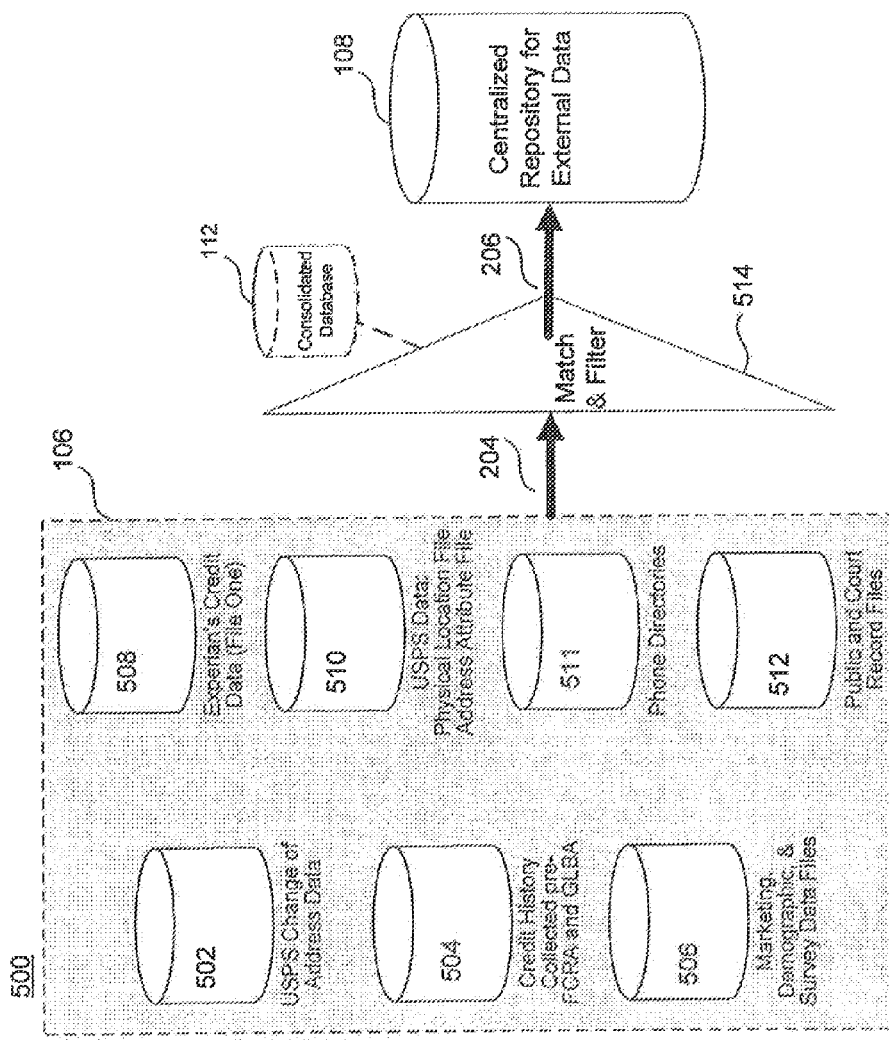
FIG. 5A is a system diagram illustrating possible sources of external personal identification information, and further illustrating the importing of that data into the centralized repository for external data via a matching and filtering process.

FIG. 5A shows a combined process 500 which embodies both step 204 of method 201, wherein external data 106 is searched and filtered; and step 206 of method 201, wherein the filtered external data is consolidated into the centralized repository for external data 108. As shown in FIG. 5A, there are a variety of possible sources 106 for external personal identification (PID) information. These sources 106 include US Postal Service change of address data 502, credit history collected prior to FCRA and GLBA 504, marketing, demographic, and survey data files 506, sources of credit data 508, other United States Postal Service data 510, phone directories 511, and public and court record files 512. It will be appreciated by those skilled in the relevant art(s) that the sources of data illustrated in FIG. 5A and described here are representative only and that in fact there exist thousands if not more potential sources 106 of PID information. The search of any and all of those sources fall within the scope of the current invention, which is neither limited to nor specifically defined by the sources described above by way of illustration.

These external database(s) 106 which constitute the possible sources of PID are searched for PID information at step 204, wherein only some of the available data is actually selected through a matching and filtering process 514, before being consolidated in step 206 into the centralized repository for external data 108. As shown in FIG. 5A, matching and filtering process 514 relies on data from CLIC database 112 to perform its matching and filtering functions. Specifically, the matching and filtering process 514 only collects PID information which is reasonably likely to be related to information on customers in the CLIC database 112. PID information which is not likely to be related to customers in the CLIC database 112 is filtered out during the matching and filtering process 514.

Figure 5B:
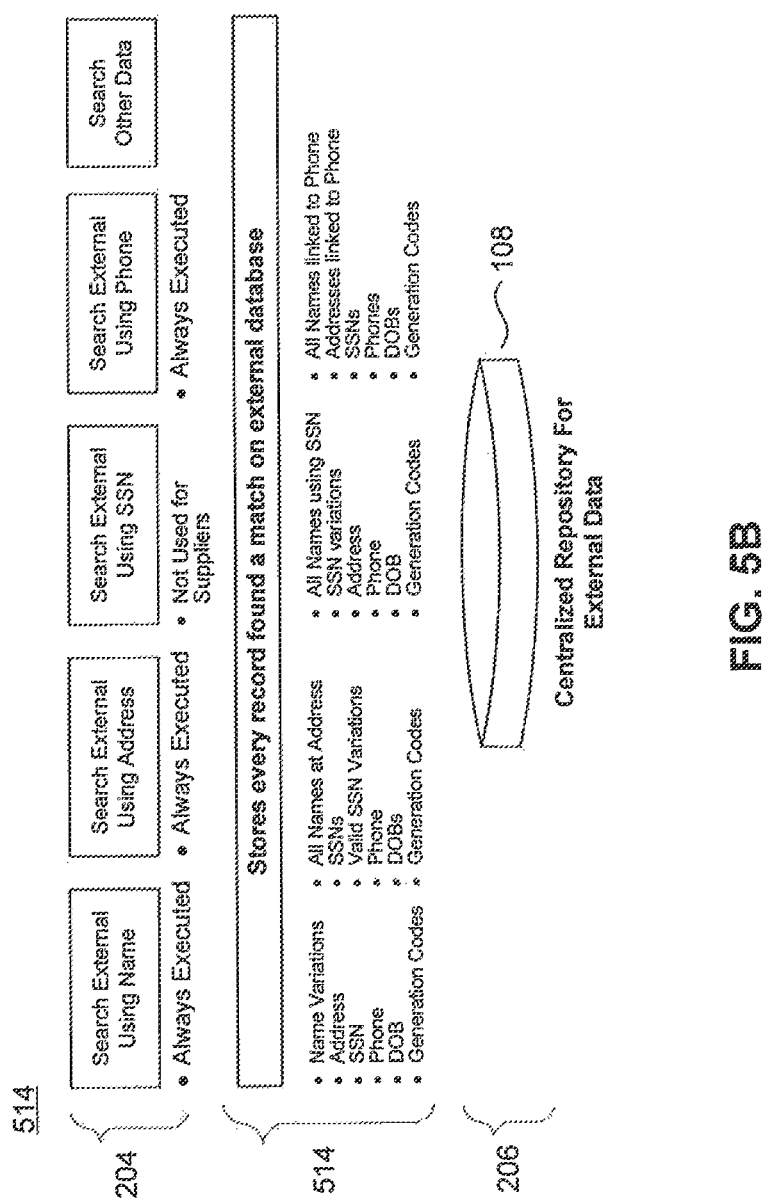
FIG. 5B is a block diagram illustrating representative criteria that may be used in an embodiment of the invention to determine which external data corresponds to customer data in the internal consolidated database, and therefore which external data should be imported into the centralized repository for external data.

FIG. 5B provides a detailed representation of external database search process 204, associated matching and filtering process 514, and consolidation step 206. Step 204 entails searching external database(s) 106 for PID using a variety of search criteria. In one embodiment of the present invention, these criteria include searching external database(s) 106 based on the names of individuals in the CLIC database 112, or based on the addresses of individuals in the CLIC database 112, or based on the social security numbers (SSN's) of individuals in the CLIC database 112, or based on the phone numbers of individuals in the CLIC database 112, or doing a search based on a combination of two or more of the above criteria. As can be appreciated by persons skilled in the relevant art(s), other types or categories of PID data can also be used as the basis for searching external database(s) 106.

In one embodiment of the present method, searches based on some types or categories of PID data are always executed, while other searches would only be performed conditionally. Searching by name, address, or phone number may always be performed, while searches by SSN would not always be executed. For example, if an account belongs to an individual or to a business which is a sole proprietorship, then a search including SSN would be performed. On the other hand, if an account is associated with a business which is not a sole proprietorship, then the impact of the SSN in the search process is reduced or may not be relevant at all (since the SSN of the account owner may not be available).

In an alternative embodiment of the present invention, searches on all available categories of PID information or a selected subset of categories of PID information are always performed. In another alternative embodiment of the present invention, searches on all available categories of PID information or a selected subset of categories of PID information are always conditional, based on various criteria regarding the status of the account information in CLIC database 112.

Matching and filtering process 514 employs a set of matching rules and/or matching criteria to determine which PID information in external database(s) 106 will be considered a potential match to PID information in consolidated database 112. FIG. 5B provides sample matching criteria. For example, in the case of a search based on name matching, external PID information is considered to be a match if certain variations on a name in CLIC database 112 are found. Also collected during this matching and filtering process, for any customer name in consolidated database 112, are all of the following which may be found in external database(s) 106: addresses associated with the name, addresses associated with variations on the name, SSN's associated with the name, SSN's associated with variations on the name, phone numbers associated with the name, phone numbers associated with variations on the name, dates of birth (DOB's) associated with the name, DOB's associated with variations on the name, generation codes (Jr., Sr., etc.) associated with the name, and generation codes associated with variations on the name.

FIG. 5B similarly illustrates matching criteria associated with a search on addresses, SSN's, and phone numbers. In each case, search process 204 and matching and filtering process 514 search both for exact matches with, and for variations on, the addresses, SSN's, and phone numbers stored in CLIC database 112. In addition, for each such match found, i.e., both for direct matches and for matches based on variations, search process 204 and matching and filtering process 514 collect related, pertinent external PID data associated with the external match.

For example, suppose a customer in CLIC database 112 has an address of "190 N. Main Ave., Tucson, Ariz. 85701", with "Avenue" abbreviated as "Ave.". Suppose also that during a search of an external database, a variation on the address is found, namely "190 N. Main Avenue, Tucson, Ariz. 85701". Matching and filtering process 514 will consider these two addresses to be a match; guided by matching and filtering process 514, search process 204 will not only collect the matching external address data (namely, "190 N. Main Avenue, Tucson, Ariz. 85701"), it will also collect all externally identified names associated with "190 N. Main Avenue, Tucson, Ariz. 85701", all SSN's associated with "190 N. Main Avenue, Tucson, Ariz. 85701", all valid SSN variations associated with "190 N. Main Avenue, Tucson, Ariz. 85701", all phone numbers associated with "190 N. Main Avenue, Tucson, Ariz. 85701", all DOB's associated with "190 N. Main Avenue, Tucson, Ariz. 85701", and all generation codes associated with "190 N. Main Avenue, Tucson, Ariz. 85701".

As another example, suppose a customer in CLIC database 112 has an SSN of 123-45-6789, with the dashes included as shown. Suppose also that during a search of an external database, a variation on the SSN is found, namely "123456789" (without the dashes). Matching and filtering process 514 will consider these two SSN's to be a match; guided by matching and filtering process 514, search process 204 will not only collect the matching external SSN (namely, "123456789"), it will also collect all externally identified names associated with SSN "123456789", all other valid SSN variations associated with SSN "123456789", all addresses associated with SSN "123456789", all phone numbers associated with SSN "123456789", all DOB's associated with SSN "123456789", and all generation codes associated with SSN "123456789".

Various embodiments of the present invention may employ different rules or algorithms to determine what are valid and non-valid variations on a name, an SSN, a DOB, or other PID information. One embodiment may employ rules which indicate that names, SSN's, DOB's, and similar information with the same essential content, but different formats, are considered to be matches. In another embodiment, the rules may indicate that certain items of omitted information, such as a missing middle name or middle initial in a name, or a missing day of the month in a DOB, constitute valid variations. Other embodiments may specifically disallow one or both of these variations.

Those skilled in the relevant art(s) will appreciate that the filtering aspect of matching and filtering process 514 is at least partly implicit in the matching process. In other words, external PID information which fails to match with internal PID information in the consolidated database, based on the matching criteria of the present invention, will not be selected for analysis or importation in method 200 or method 201, and therefore such non-matching PID data is inherently filtered.

Similarly, it will be appreciated that active filtering criteria could be included as well as part of matching and filtering process 514. To name just one example, the date of external PID information could be used as a filter criteria. For one possible embodiment of the present invention, if it is possible to determine the date of external PID information, a filter criteria may determine that certain types of external PID information which are indicated as being older than some filter date will not be included.

More generally, persons skilled in the relevant art(s) will appreciate that the matching and filtering criteria shown in FIG. 5B and described above are for purposes of illustration only, representing only an embodiment of the invention, and that a wide variety of suitable matching and filtering criteria may be employed to implement the present invention.

Finally, in step 206 the external PID information collected from external database(s) 106 via search 204 and matching and filtering process 514 is consolidated into a centralized repository for external data 108.

Figure 6:
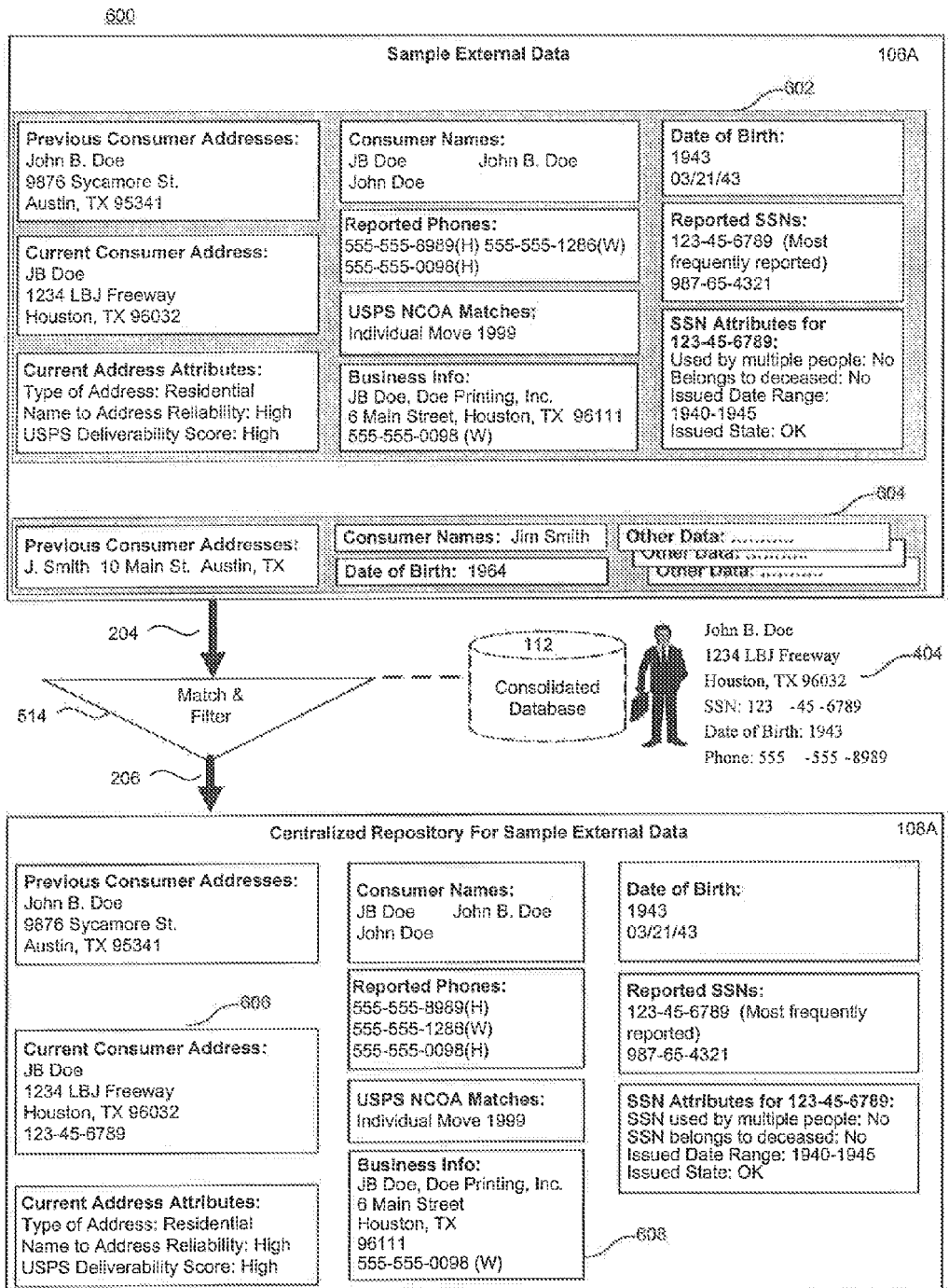
FIG. 6 is an example of representative external personal identification information which is matched and filtered for import into the centralized repository for external data.

FIG. 6 provides a concrete illustration 600 of steps or processes 204, 206, and 514, where sample external data 106 is searched, and where the data is filtered and consolidated into the centralized repository for external data 108. Sample external database 106A contains at least two sets of sample external data, namely sample external data 602 related to a person variously known as John B. Doe, J B Does, or John Doe, and sample external data 604 related to a person variously known as J. Smith or Jim Smith. Sample external database 106a is searched in step 204, and the searched information is passed through matching and filtering process 514.

Matching and filtering process 514 does the filtering based on PID data 404 found in CLIC database 112. In this case, the PID information 404 relates to John B. Doe. Therefore, information pertaining to John B. Doe, i.e., names, addresses, SSN information, and phone numbers, all of which could be related to John B. Doe, are passed by matching and filtering process 514, and then during step 206 are consolidated into the example centralized repository for sample external data 108A. Two particular items of data which have been extracted from the external database(s) 106 and consolidated into the centralized repository are a data record 606 pertaining to a consumer JB Doe and a data record 608 pertaining to a business owned by a JB Doe.

Once external data has been filtered and consolidated into the centralized repository for external data 108, the next stage in method 200 or method 201 is step 208, which entails analyzing the internal customer account data in the CLIC database 112 and the external PID information now stored in the centralized repository for external data 106 in order to create a linkage between customer accounts.

Figure 7:
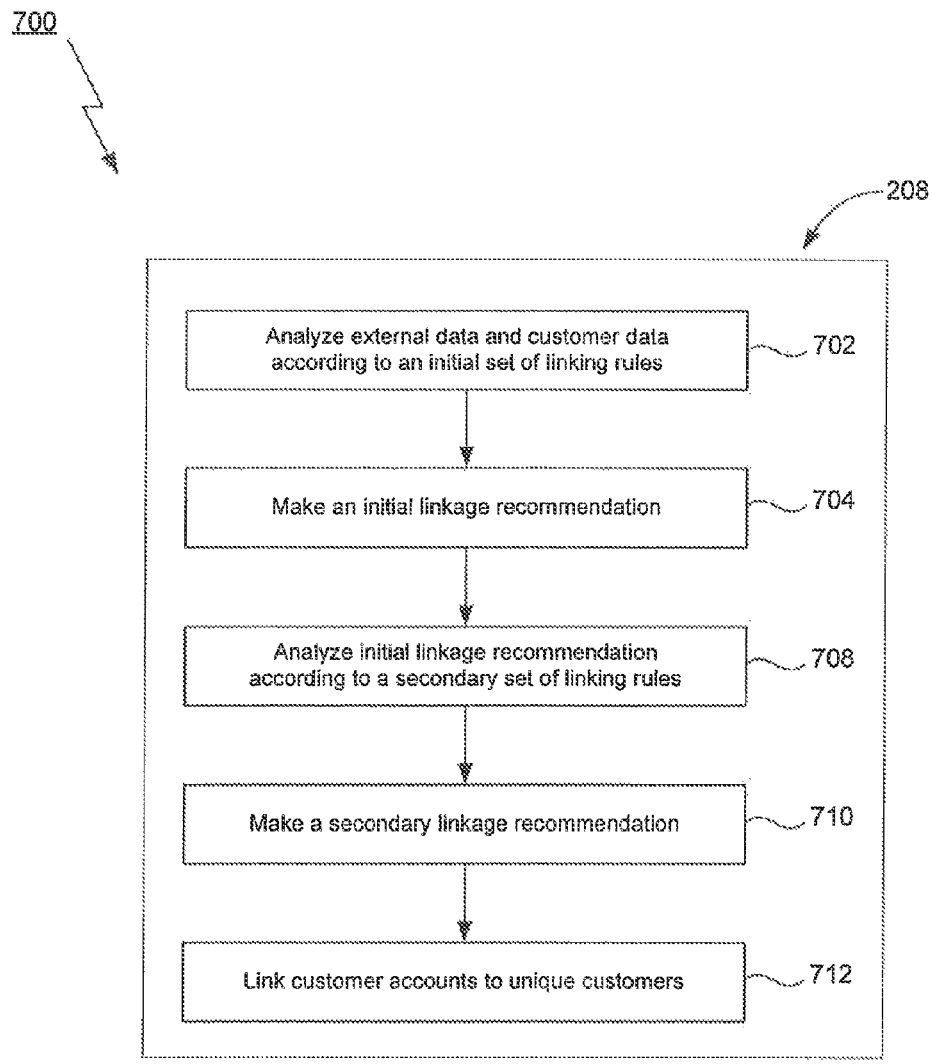
FIG. 7 is a flow chart of a method by which linkage recommendations are made, and linkages established, between customers and customer accounts in one embodiment of the present invention.

FIG. 7 shows a series of steps 700 which are used to implement step 208 of method 200 or method 201. In step 702, the external data in the centralized repository for external data 106 and the internal customer data in the CLIC database 112 are analyzed according to an initial set of rules. Based on the analysis in step 702, the present method makes an initial linkage recommendation 704. The next step 708 analyzes the initial linkage recommendation according to a secondary set of rules. Based on this analysis, a secondary linkage recommendation is made in step 710. Finally, based on the secondary linkage recommendation, customer accounts are linked to unique customers in step 712.

It should be noted that there is nothing inherent in the overall method of the present invention which requires that the process of linking customer accounts must occur in two stages, or that the rules which determine the linking process comprise an initial set of rules and a secondary set of rules. In another embodiment in the present invention, there is only a single set of linking rules and a single stage of linking recommendations. In yet another embodiment of the present invention, there are three or more sets of linking rules, and three or more stages of linking recommendations.

For those embodiments of the present invention which contain two or more sets of linking rules, and two or more corresponding stages of linking recommendations, there are several objectives. One objective of having multiple sets of linking rules is that a first stage of the linking process can be accomplished via third-party or standardized or off-the-shelf software which employ generic or commonly used data linking rules or data linking algorithms, while a second stage or second and later stages of the linking process can employ data linking rules or data linking algorithms which are customized to the needs of a particular business or organization. Another objective of having multiple sets of linking rules, with two or more corresponding stages of linking recommendations, is that manual or automated validation processes can be introduced at multiple points in the linking process, prior to a final set of account and customer links being implemented.

Figure 8:
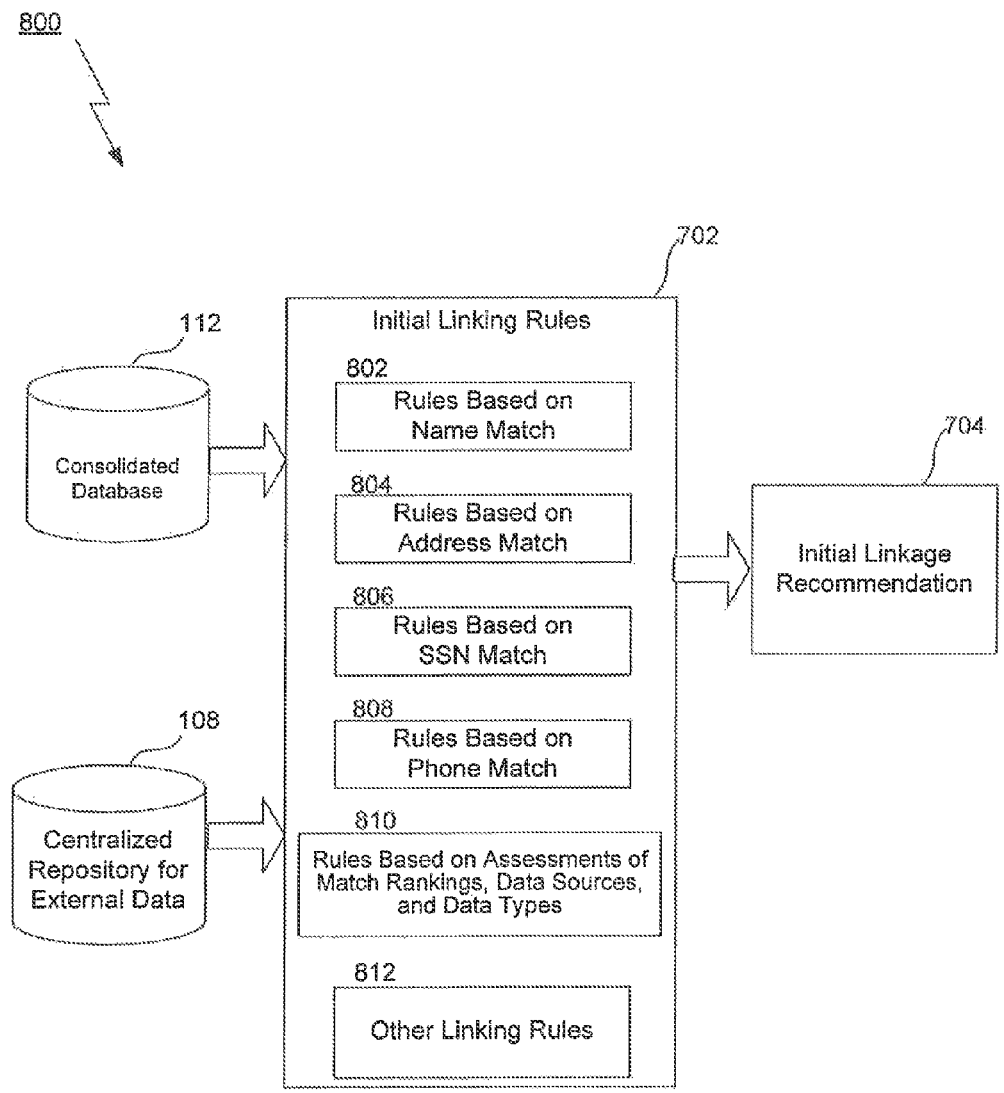
FIG. 8 is a block diagram showing both the flow of data and the data processing entailed in making an initial linkage recommendation in an embodiment of the present invention.

FIG. 8 shows a series of steps 800 by which step 702, the analysis of external data and customer data according to an initial set of rules, is implemented. In steps 800, data is taken from the consolidated database 112, and also taken from the centralized repository for external data 108, and a series of rules are used to try to establish matches. For example, the rules may include rules 802 based on name matches, rules 804 based on address matches, rules 806 based on SSN matches, rules 808 based on phone number matches, and rules 810 based on match rankings and data sources. There may be other rules 812 as well.

The rules 810 based on reliability, recency, and corroboration of data sources and data types pertain to assessments and rankings to determine which type of matches are more likely to result in a reliable matching. For example, a match ranking may indicate that minor variations on names are highly likely to be good matches for each other. An example of a minor variation in a name is a case where one name (such as one found in the CLIC database 112) has a middle initial, whereas another name (such as one found in the centralized repository for external data 108) is identical to the name in the CLIC database 112 except for the lack of the middle initial. In another example, a match ranking may indicate that a match based on an SSN match, where two numbers are transposed between two different SSN's, has a lower likelihood of being a correct match.

A person skilled in the relevant art(s) can appreciate that various sets of rules can be implemented to determine the likelihood that various sources of PID information are reliable, or that various different PID matching rules are reliable. Persons skilled in the relevant art(s) will also recognize that algorithms can further be implemented, based on various matching rules, to determine that two PID's, which initially appear to be related to two different people, are in fact actually the same PID of one unique person.

Based then on these initial rules, which may comprise rules regarding name matches, address matches, SSN matches, phone matches, rules based on match rate rankings and data sources, and still other rules, an initial set of linking recommendations are arrived at in step 704.

Figure 9A:
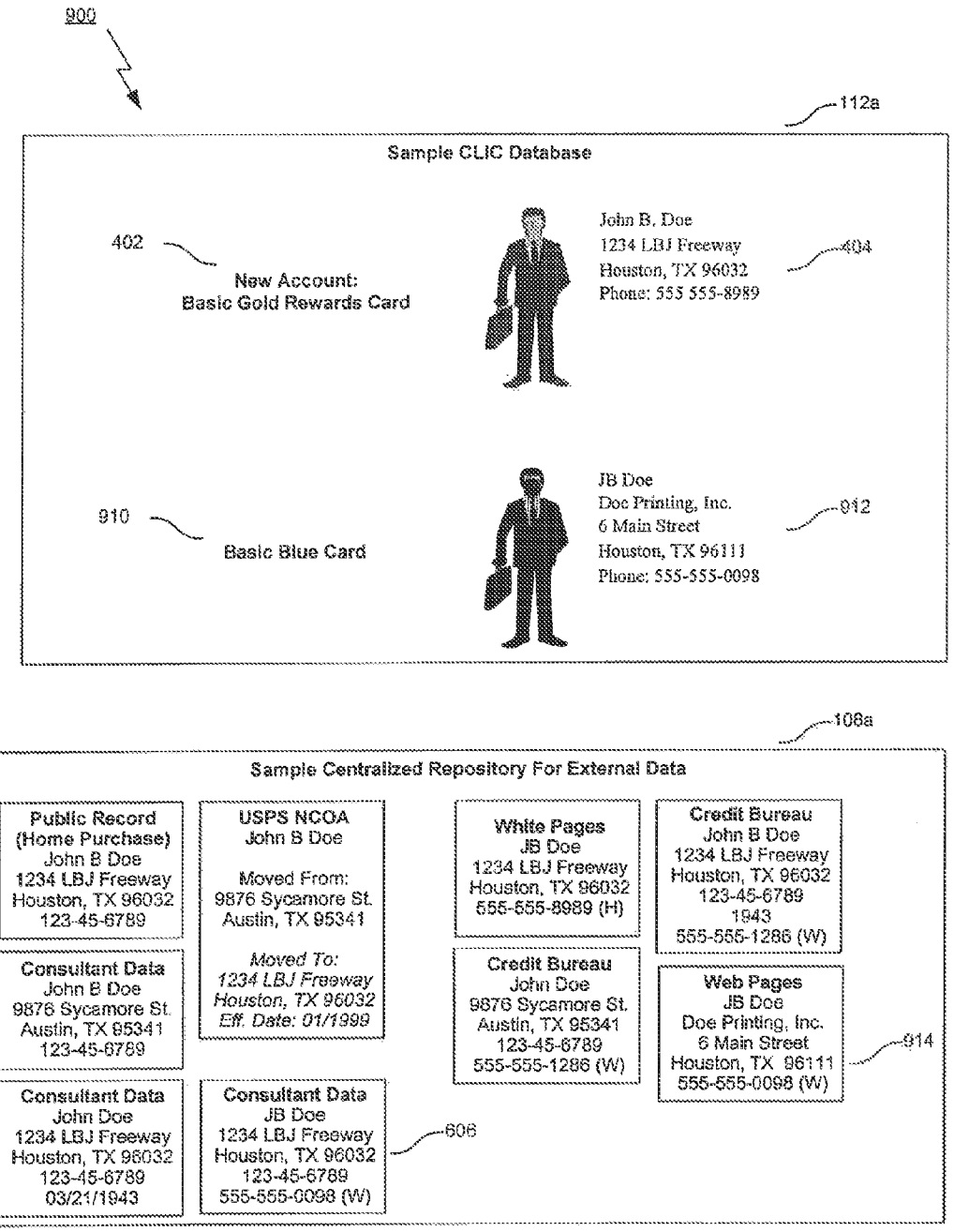
FIG. 9A is an example of how the initial rules may be applied to analyze external personal identification data in relation to a customer listed in the consolidated database.
Figure 9B:
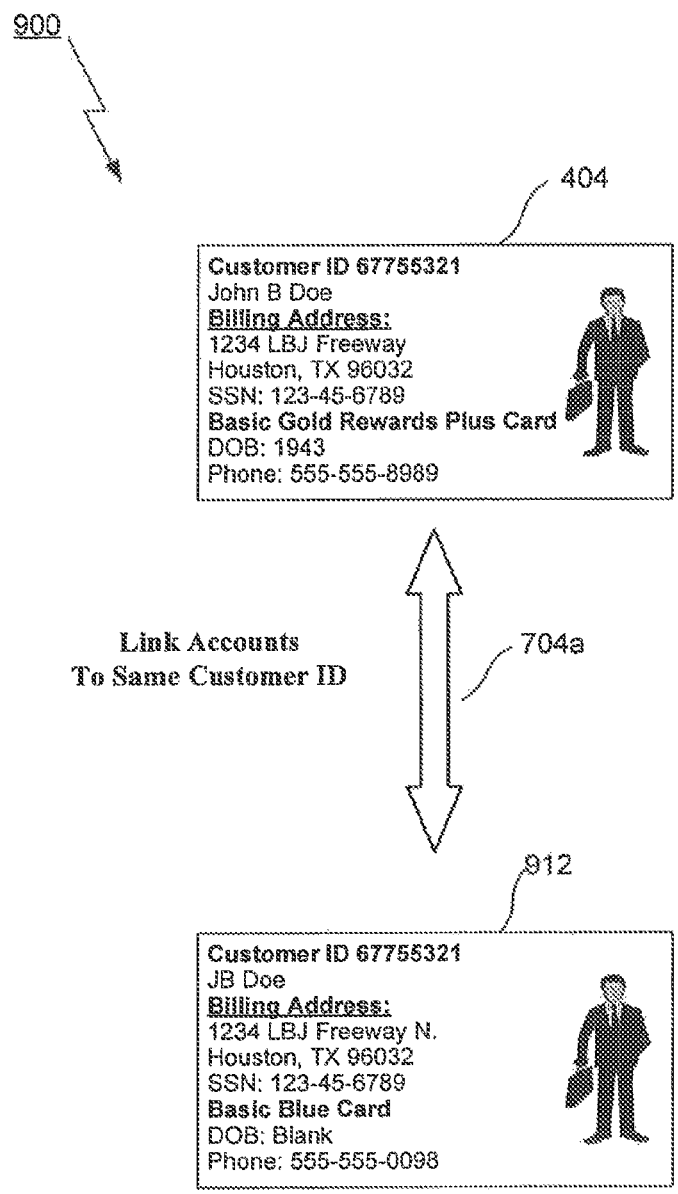
FIG. 9B is an example of how the initial rules may be applied to link two customer accounts.

FIGS. 9A and 9B together show an example 900 of step 702, wherein two existing internal PID's in the CLIC database 112 can be matched up with a searched for and saved PID in the centralized repository for external data 108; the result is a recommendation 704 for a new link between customer accounts. Referring back to FIG. 4, a new account 402 for a Basic Gold Rewards Card, which is associated with customer John B. Doe 404, is stored in the CLIC database 112. Not shown in FIG. 4, but assumed for purposes of this example and shown in FIG. 9A and FIG. 9B, is that a customer JB Doe 912 with a Basic Blue Card account 910 is also stored in the CLIC database 112. Customer John B. Doe 404 has a home address, while customer JB Doe 912 has a business address.

Referring back to FIG. 6, an external PID for an individual JB Doe 606 is imported into the centralized repository for external data 108a. Also referring back to FIG. 6, an external PID for a business owner JB Doe 608 is imported into the centralized repository for external data 108a.

Now returning to FIG. 9 and example 900, the method of step 702, involving linking rules, is exemplified. The initial linking rules associate John B. Doe 404 and JB Doe 606 based on a high probability partial name match and an exact address match. The initial linking rules associate JB Doe 606 and JB Doe 914 based on an exact name match, a city and state match, and a work phone match. Finally, the initial linking rules also associate JB Doe 912 and JB Doe 914 based on an exact name match and an exact business address match.

Through this series of links, namely John B. Doe 404→JB Doe 606, followed by JB Doe 606→JB Doe 914, and then JB Doe 914→JB Doe 912, we arrived at the linkage John B. Doe 404=JB Doe 912. Based on the set of rules, then, two separate customers 404 and 912, with two separate accounts 402 and 910 respectively, can now be linked to each other. FIG. 9B shows this initial linking recommendation 704a.

There are many variations in the analysis via a set of initial rules 702 that can be used for making the initial linkage recommendation 704. For example, the analysis via a set of initial rules 702 will create a preliminary, plausible set of linkages 704 between different customers and customer accounts. The purpose of analyzing the initial linkage recommendations 704 according to a secondary set of rules 708 is to get a more refined and more accurate linking recommendation 708 of customers, both removing some linkages that should not have been made in the first place, and detecting some linkages that might have been omitted by the preliminary linkage rules employed in step 702.

Figure 10A:
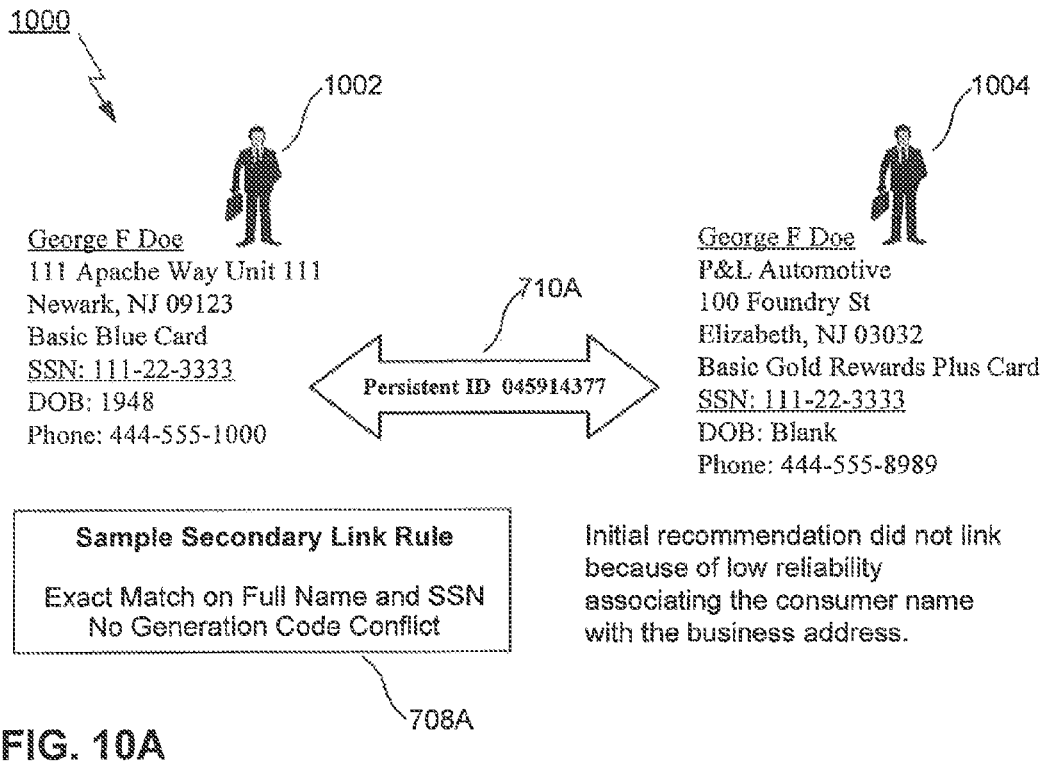
FIG. 10A is a first example of a secondary linking rule, and the application of the rule to a customer linkage.
Figure 10B:
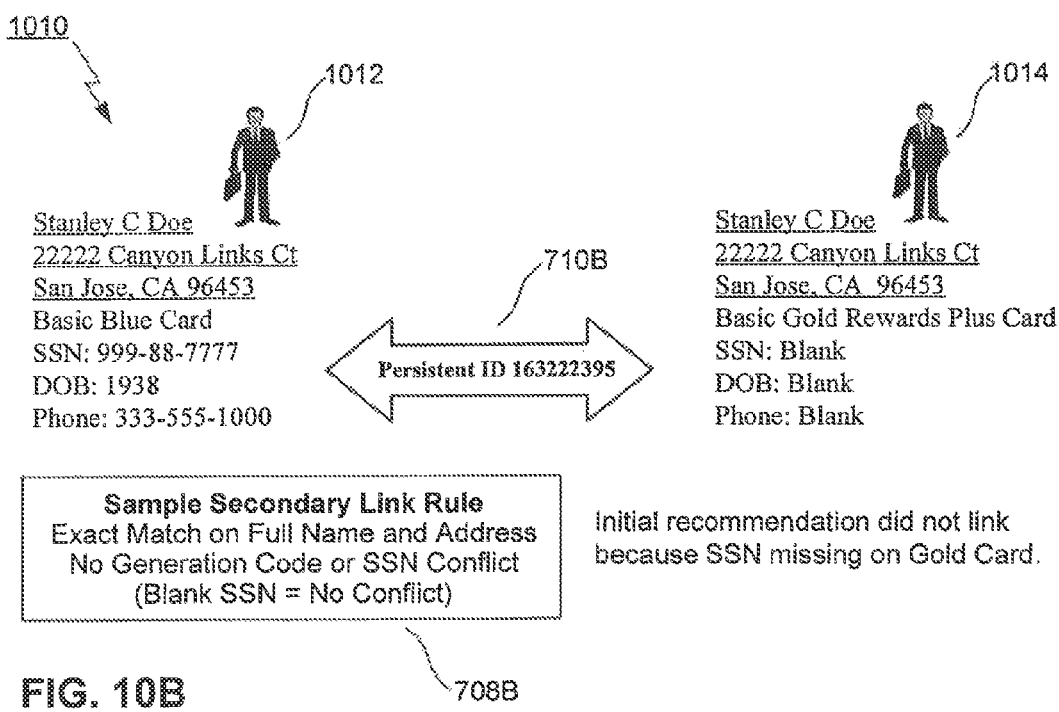
FIG. 10B is a second example of a secondary linking rule, and the application of the rule to a customer linkage.

FIGS. 10A and 10B provide illustrations 1000 and 1010, both of analyses via secondary linking rules 708 and of the linkage recommendations 710 that can result from the analysis via secondary rules 708.

FIG. 10A shows two customers, George F. Doe 1002 and George F. Doe 1004, where an initial recommendation did not link the two customers because of a low reliability associating the consumer name with the business address, since George F. Doe 1002 is listed with a home address, and George F. Doe 1004 is listed with a business address. However, the sample secondary linkage rule 708A states that if there is an exact match on the full name and the social security number, and if there is no generation code conflict, then a secondary linkage recommendation should be made. A secondary linkage recommendation 710A is illustrated wherein a persistent ID has been assigned jointly to both George F. Doe 1002 and George F. Doe 1004.

FIG. 10B illustrates the case where Stanley C. Doe 1012 and Stanley C. Doe 1014 were initially not linked because the social security number was missing on the Gold Card of Stanley C. Doe 1014. However, secondary sample linkage rule 70813 states that a link should be made if there is an exact match on the full name and address, and there is no generation code or SSN conflict, wherein a blank SSN is considered to be synonymous with there being no conflict. As a result, a secondary linkage recommendation 710B is made between Stanley C. Doe 1012 and Stanley C. Doe 1014, both of whom have the same name and the same address and are then jointly assigned the same persistent ID.

The process described above, wherein two customers formerly viewed as separate customers are discovered to actually be the same person, can be repeated as many times and as often as necessary. The end result may be, and in a large enough database is likely to be, that at least in some cases more than two customers will ultimately be identified as actually being the same person. That is to say, through this process, multiple customer records which were viewed as records of distinct persons will be linked as being one unique person.

In addition, a thorough and exhaustive processing of a CLIC database 112 according to the present method and invention is likely to result in the removal of most if not all of the redundant customer identifications. Put another way, the present method, when employed exhaustively, may result in the identification of multiple sets of customers, wherein the customers in each set become recognized as actually being the same person, and are so identified through this process. In addition, all the accounts associated with the customers in each such set will now be linked to each other, and to the one unique customer of the set, through this process.

In any database system, an issue arises when attempting to consolidate, join, or otherwise associate data records or other data structures which were previously viewed as separate, namely, the question of precisely how to modify the existing data in order to reflect the new associations. This is particularly a significant issue in the context of the present invention, and especially in contexts where the method of the present invention is to be implemented in a large organization. Even though, in step 202 of methods 200 or 201, all internal customer account data is consolidated in the CLIC database 112, it may also remain the case that separate databases and entire separate data processing systems remain in use in different business units of the large organization.

Figure 11A:
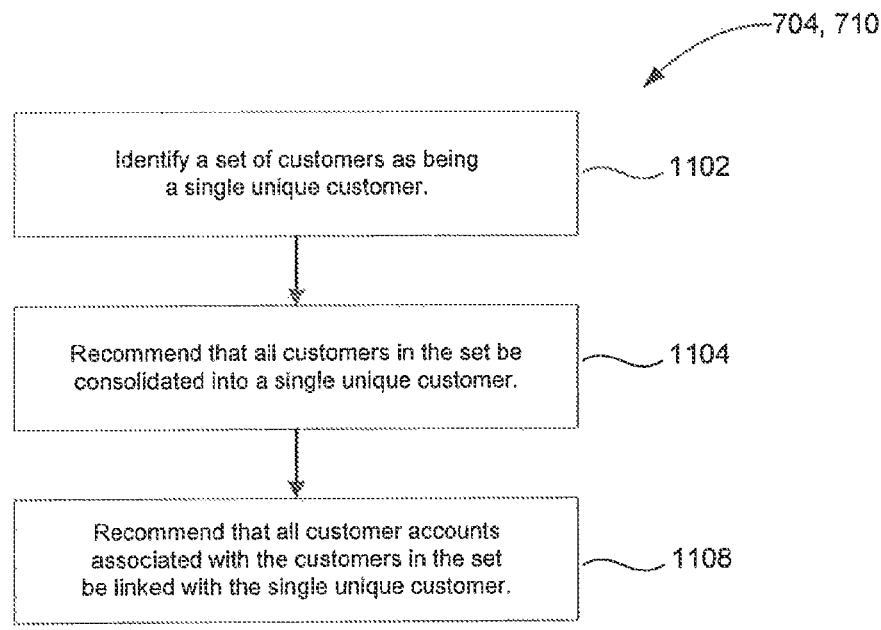
FIG. 11A is a flowchart showing the detailed steps of the linkage recommendations involved in steps 704 and 710.
Figure 11B:
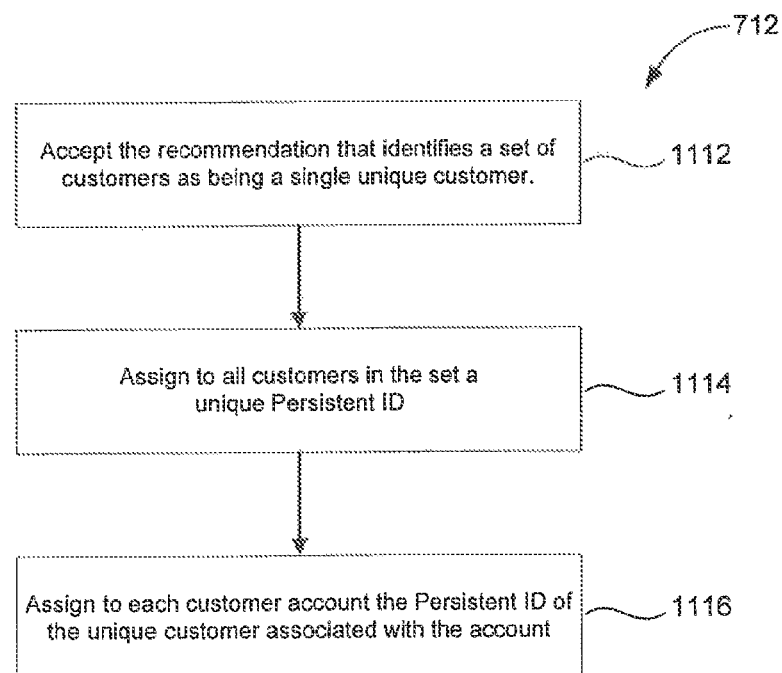
FIG. 11B is a flowchart showing the detailed steps for linking customer records, formerly treated as separate customers, so that they are one unique customer, and also linking the appropriate customer accounts to the one unique customer.

FIGS. 11A and 11B illustrate a method according to one embodiment of the present invention for linking customer accounts, and for consolidating customer information, which addresses this challenge, i.e., which implements the actual linking process which is described in steps 704, 710, and 712 of step 208.

FIG. 11A shows how a linkage recommendation 704 or linkage recommendation 710 is made. The first step 1102 entails identifying a set of customers as being a single unique customer. This means that a set of customers, i.e., internal customers, who were initially regarded as being distinct or separate customers, are now recognized as all in fact being the same unique customer according to the methods described above. In step 1104, it is recommended that all the customers in the set be consolidated into a single unique customer, and in step 1108, it is recommended that all customer accounts associated with the customers in the set be linked with the single unique customer.

FIG. 11B shows the actual steps 712 involved in making these linkages according to one embodiment of the present invention. Step 1112 entails accepting the recommendation that identifies a set of customers as being a single unique customer. In step 1114, there is assigned to all customers in the set a unique persistent ID. This unique persistent ID is one single, unique signifier completely unique to this newly identified unique customer, which serves to distinguish this customer from all other customers throughout the consolidated database 112, and further to distinguish this customer from all other customers with customer information stored on any other databases throughout the business, organization, or other enterprise. Finally, in step 1116, the method assigns to each customer account which belongs to that customer the persistent ID of the unique customer.

The persistent ID may take the form of a number, which may be expressed in base ten, in hexadecimal, in octal numbering, in binary, or in some other numbering system. In an alternative embodiment the persistent ID may take the form of a code which is alphanumeric, or which strictly uses alphabetic characters, wherein the characters of the alphabet may be selected from the American alphabet, or from the alphabet of any known language, or any language to be developed in the future. In an alternative embodiment of the invention, the persistent ID may take some other representational form, such as a bar code, a graphic image including for example and without limitation a vector graphic image or a bitmapped graphic image, an audio representation, a video representation, a holographic representation or encoding, or any other form which can be used to uniquely identify a record or identify data in any kind of storage medium wherein customer information and customer account information may be stored in a database of any kind.

An advantage of this method, wherein a unique persistent ID is assigned to each unique customer, is that it remains possible to retain separate customer databases, and possibly even different customer descriptions, on multiple databases throughout the business enterprise. Thus, while the CLIC database 112 is used to store all internal customer IDs for purposes of implementing the current invention, the unique, persistent customer IDs, once generated, can be distributed among other databases which retain customer records.

In one example, if a customer identified as JB Doe on one database and John B. Doe on another database is in fact the same unique customer, then the assignment of a singular, unique persistent ID to both JB Doe and John B. Doe ensures that the associated data records will be recognized throughout the business as belonging to the same customer. With this approach, it may be desirable to implement methods wherein when updates are made to a data record for a customer anywhere in the business, suitable updates are also made to other data records for the same customer, stored on other databases throughout the business.

It will be appreciated by those who are skilled in the relevant art(s) that the method just described is amenable to numerous variations in terms of the steps of processing or stages of processing involved, and in terms of the particular configuration or particular architecture of the system. For example, the method just described could entail permitting multiple records of the same customer to remain on multiple databases, as long as all such records are linked by the same unique persistent ID. However, in another embodiment of the present invention, all records identifying a unique customer could be consolidated into a single database which is then referenced, throughout the enterprise, anytime customer information is required. This single database could be same database as the CLIC database 112. In another embodiment, the CLIC database could be used for implementing the method of the current invention, while a second database which mirrors the CLIC database 112, and in particular stores all the unique customer information and customer IDs, could be used for all other business-related processing.

Similarly, while the method of the present invention generally envisions using a large number of external database(s) as a means of obtaining variations on a customer identification for purposes of matching customers PID's, it is possible that a similar matching process could also entail simply using different sources of internal personal identification without reference to any external database(s). In general, it is an objective of the present invention to recognize that certain internal PID's which heretofore have been interpreted as separate customers are in fact one and the same customer, and having made that recognition to ensure that all accounts which are associated with those PID's become associated with the single unique person who is actually the unique customer behind all those different personal identifications.

Figure 12:
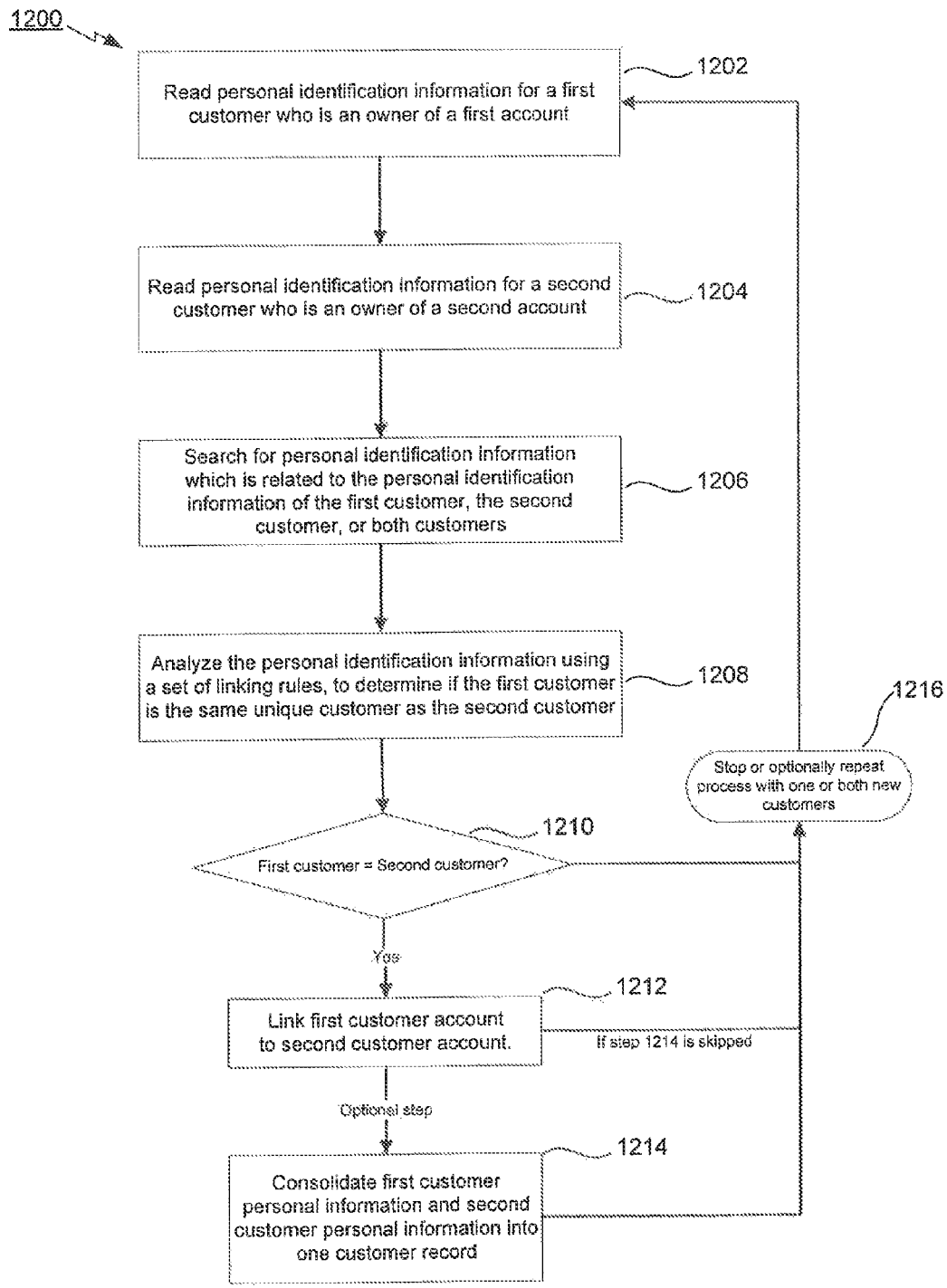
FIG. 12 is an alternative representation of a customer linking and identification capability method.

FIG. 12 illustrates a method 1200 according to an embodiment of the present invention which results in linking disparate personal identifications and accounts that should appropriately be linked to each other. Step 1202 entails reading a PID information for a customer who is an owner of a first account, which may be a banking account, an investment account, or any number of other kinds of institutional accounts. Step 1204 entails reading a PID information for a second customer who is an owner of a second account. Step 1206 entails searching for PID information which is related to the PID information of the first customer, or searching for PID information which is related to the PID information of the second customer, or possibly searching for PID information which is related to the PID information of both the first customer and the second customer.

Step 1208 entails analyzing all of the previously gathered PID information relating to the first customer, the second customer, and any PID information related to either or both of the first customer and the second customer, to determine if the first customer is the same unique customer as the second customer.

It will be appreciated by those skilled in the relevant art(s) that the method for this analysis of step 1208 will be similar to those previously described, using linking rules so as to determine matches between names or similarities between names, matches between social security numbers or similarities between social security numbers, matches between addresses or similarities between addresses, records indicating change of address, records indicating change of name, matches between telephone numbers or similarities between telephone numbers, and other recognitions of either matches or similarities between PID data, and/or transitions of PID data such as change of address, change of name, change of phone number, and related changes. The list of linking criteria presented is representative only, and the actual linking analysis need not include all of these rules or criteria, and may include others not listed here, including rules of a probabilistic nature wherein an evaluation is made of the likelihood that certain matches are reliable or not reliable.

Having performed this analysis 1208, the method then determines in step 1210 whether the first customer is in fact the same person as the second customer. If the answer is yes, then the first customer is linked to the second customer account, meaning it is recognized that both accounts actually belong to the same customer.

Optional step 1214 would entail consolidating the first customer PID information and the second customer PID information into one consolidated customer record. If the first customer is not the same as the second customer, then step 1216 either entails stopping the process or optionally repeating the process, with either one or two new customer records associated with customer accounts.

On the other hand, if the first customer and the second customer are recognized as being the same customer in step 1210, then following either step 1212 or step 1214, step 1216 is again performed, meaning either that the process stops, or optionally is repeated with an evaluation of the same customer against other customer records, or with an evaluation of two new customer records.

Finally, those experienced in the art will recognize that there are a number of variations on the indicated methods of the current invention which fall within the essential spirit and scope of the invention. For example, as has been indicated here, linking customers and linking customer accounts is done by assigning to each customer a unique persistent ID, which indicates that previously separate customers are in fact the same customer; and further, that the unique persistent ID is then assigned to all accounts that are associated with the unique customer.

However, persons skilled in the relevant art(s) will recognize that there are numerous other methods for linking both customers and customer accounts. For example, customers who are construed to be the same customer, but still retain a separate ID number, could nonetheless have a field in their data records which acts as a pointer or cross reference to other ID numbers which have been linked to the same customer. Similar pointer-type structures could be used to link accounts to all these customers who are now recognized as being in fact the same unique person.

In yet another possible embodiment, a database table or similar database structure could be used to list the names of all customers who are now recognized as being one unique customer, along with the accounts which are recognized as being associated with that one unique customer. Other possible means of identifying the disparate personal identifications belonging to disparate customers as actually being one unique customer, and also recognizing that the accounts associated with those disparate customers are actually linked to one unique customer, can also be envisioned and implemented.

The final stages of method 201 entail link validation 212, link correction 214, and modification 216 of the linking rules based on discovered errors.

Figure 13:
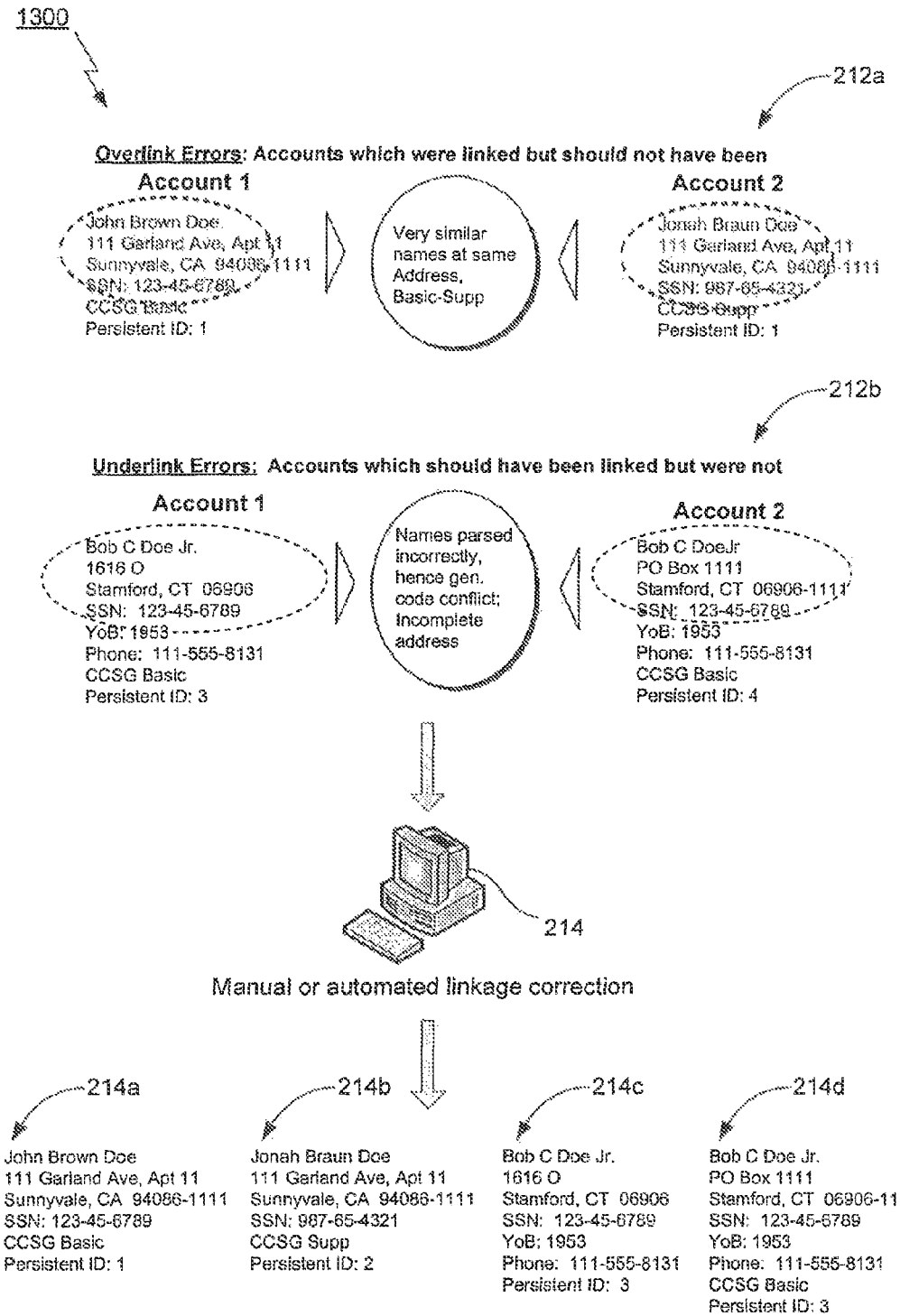
FIG. 13 illustrates two examples of corrections required due to overlink errors or underlink errors.

FIG. 13 provides an illustration 1300 of two examples of step 212 of the present method, wherein linkage errors are identified, and also of step 214 of the present method, wherein the linkage errors are corrected. In example 212*a* there is an overlink error indicating accounts which were linked via common persistent ID value '1', but which should not have been linked. In this instance, persons with very similar names "John Brown Doe" and "Jonah Braun Doe" are both living at the same address. Even though their SSN's are different, they were linked on the basis of the address and the similarity of the names.

In example 212*b* we have an underlink error, wherein accounts which should have been linked were not, and so have separate persistent ID values '3' and '4'. In this case, the first account has the name "Bob C. Doe, Jr." with proper spacing among all the elements of the name, whereas the second name has "Bob C. Doe, Jr.", where there is an omission of a space between the last name "Doe" and the generation code "Jr.". As a result, the last name appears to be "DoeJr.", in addition, since the street addresses are different, this is a further signal to the method that this is not the same person, (In one case an actual street address is used, while in the other case there is a P.O. box.) Even though the city and state are the same, and even though the SSN, DOB, and even the phone numbers are the same, nonetheless the discrepancy in the names and street addresses results in the two accounts not being linked to each other.

In step 214 a manual or automated linkage correction is made. A manual linkage correction would involve a financial institution database manager or financial institution customer service representative discovering the failure of the two accounts to be linked, or discovering two accounts being linked which should not have been linked, and manually separating them.

An automated linkage correction is accomplished by a set of rules or algorithms which do a final pass and search for any kind of subtle errors which were not previously flagged. For example, using the underlink error 212*b* described above, a software algorithm could be designed to go through and compare names for the possibility that two names which are similar, but not the same, are actually the same name. Persons skilled in the relevant art(s) will recognize that algorithms can be employed here similar to those employed in spell checking systems, where the software can experiment with transposing letters in a name, or introducing spaces or removing spaces, as a way of generating alternative names and comparing those alternative names to see if there is a match on that basis.

A combination of automated and manual linkage correction could be employed. For example, the software could generate variations on names, addresses, SSN's, and other PID data, and/or suggest possible linkages based on those variations; however, the final determination as to which accounts to link or to not link could be made by a human operator, who would be presented with these linkage options via a computer interface (not shown).

As a result of the linkage corrections shown in illustration 1300, the corrected customer account 214*a* for John Brown Doe is shown with persistent ID '2', while the corrected customer account 214*b* for separate customer Jonah Braun Doe is shown with different persistent ID '2'. Further, the corrected customer accounts 214*c* and 214*d* for customer Bob C. Doe, Jr. now share the same persistent ID '3', indicating that both accounts belong to the same unique customer.

In one embodiment of the present invention, the current method may take the additional step of making any necessary corrections to customer data, based on the analyses described above. In this case, the erroneous listing in example 212*b* for 'Bob C DoeJr' has been corrected for the account 214*d*, which now reads 'Bob C Doe Jr.'

Figure 14:
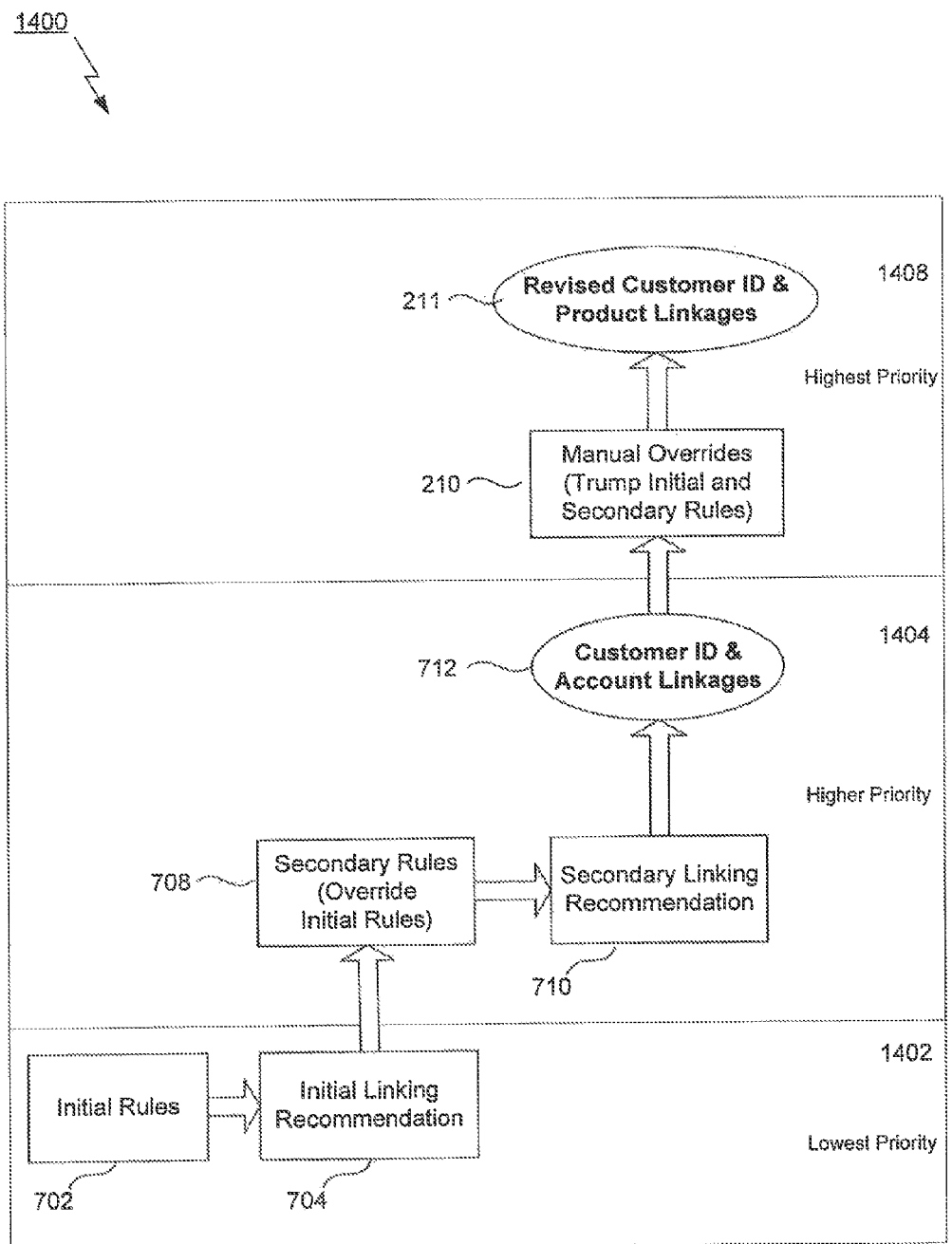
FIG. 14 illustrates the hierarchy of linking rules in a CLIC process which employs multiple stages of rules processing.

In one embodiment of the present invention, a hierarchy exists among the linkage rules and linkage recommendations of method 200 or method 201. FIG. 14 is a block diagram indicating one possible hierarchy. Linkage rules or recommendations for linkages of higher priority will take precedence over those of lower priority. For example, there is a set of initial rules 702 which leads to the initial linking recommendation 704, both of which have the lowest priority 1402. That is followed by the secondary rules 708 and secondary linking recommendations 710 which have a higher priority 1404. The higher priority means that those secondary rules 708 and secondary linking recommendations 710 may override the initial linking rules 702 and initial linking recommendations 704, resulting in the customer ID and account linkages 712.

The highest priority 1408 is given to the manual overrides, which trump both the initial rules 702 and secondary rules 708, resulting in revised customer ID and product linkages 211. In another embodiment of the present invention there may exist a more fine-grained hierarchy of rules and linking recommendations than shown in the embodiment discussed and illustrated here. In another embodiment of the present invention, there is no hierarchy among the linking rules or recommendations.

V. Example Implementations

The present invention, as typically embodied in a system 100 of organizational intranet 114 and external network 110 and external database(s) 106, and as embodied in method 200 or method 201, or as implemented in alternate embodiments as suggested throughout this detailed section and the appended claims, or any part(s) or function(s) thereof, may be implemented using hardware, software, and human operator decision making, or a combination thereof and may be implemented in part or in whole by one or more computer systems or other processing systems. However, the manipulations performed by the present invention were often referred to in terms, such as analyzing or comparing, which are commonly associated with mental operations performed by a human operator.

While, as indicated above, the intervention of a human operator may play a role in validity checking of auditing of, or modification of the customer and account linkages established in the present invention, such intervention of a human operator is only necessary in some embodiments of the present invention and not others. In most cases, most and possibly all of the operations described herein which form part of the present invention are performed without the intervention of a human operator. Rather, the operations are machine operations. Useful machines for performing the operation of the present invention include general purpose digital computers or similar devices.

Figure 15:
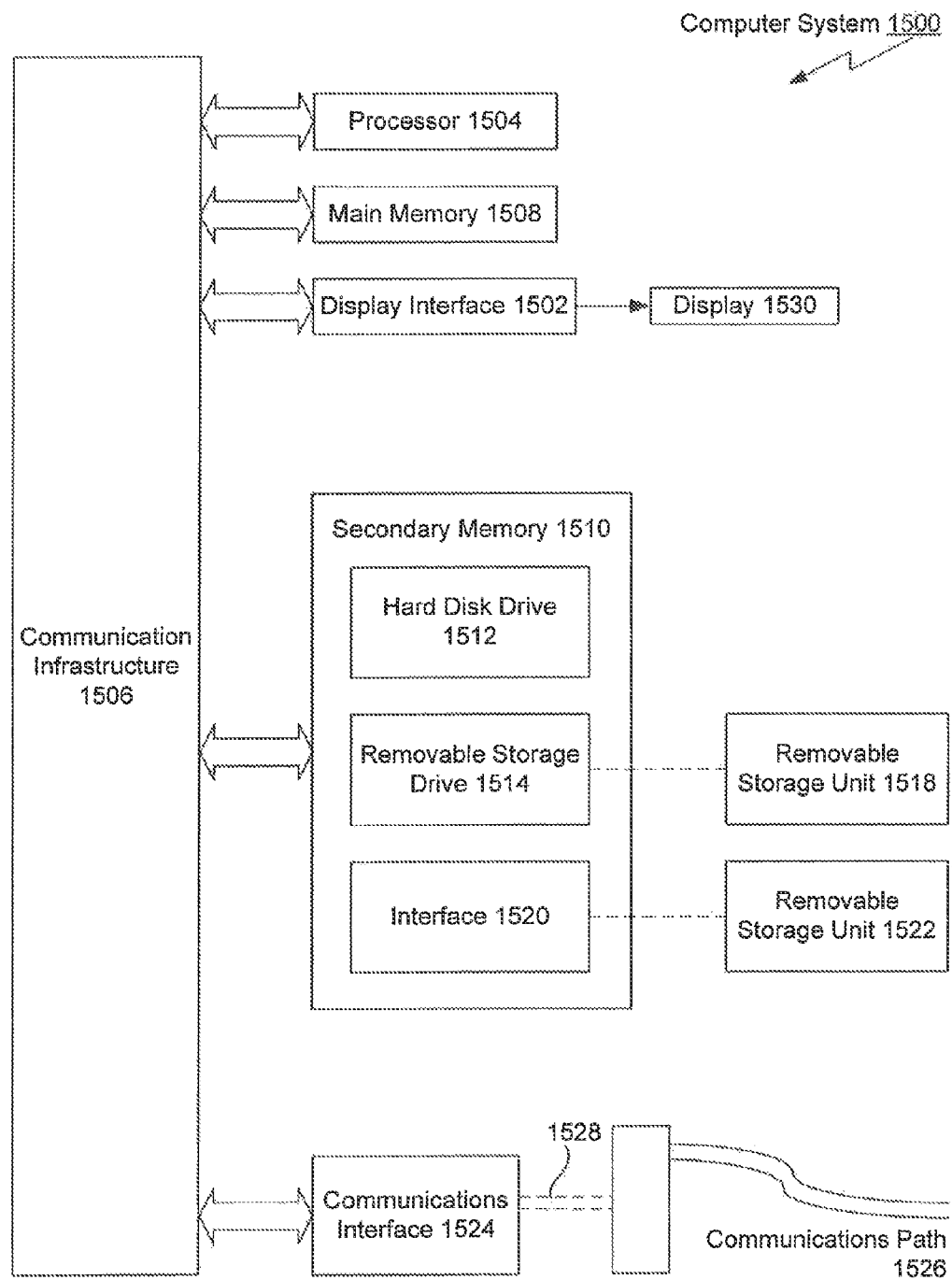
FIG. 15 is a block diagram of an exemplary computer system useful for implementing the present invention.

In one embodiment, the invention is directed toward one or more computer systems capable of carrying out the functionality described herein. An example of a computer system 1500 is shown in FIG. 15.

The computer system 1500 includes one or more processors, such as processor 1504. The processor 1504 is connected to a communication infrastructure 1506 (e.g., communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 1500 can include a display interface 1502 that forwards graphics, text, and other data from the communication infrastructure 1506 (or from a frame buffer not shown) for display on the display unit 1530.

Computer system 1500 also includes a main memory 1508, preferably random access memory (RAM), and may also include a secondary memory 1510. The secondary memory 1510 may include, for example, a hard disk drive 1512 and/or a removable storage drive 1514, representing a floppy disk drive, a magnetic tape drive, an optical disk drive, etc. The removable storage drive 1514 reads from and/or writes to a removable storage unit 1518 in a well known manner. Removable storage unit 1518 represents a floppy disk, magnetic tape, optical disk, etc. which is read by and written to by removable storage drive 1514. As will be appreciated, the removable storage unit 1518 includes a computer usable storage medium having stored therein computer software and/or data.

In alternative embodiments, secondary memory 1510 may include other similar devices for allowing computer programs or other instructions to be loaded into computer system 1500. Such devices may include, for example, a removable storage unit 1522 and an interface 1520. Examples of such may include a program cartridge and cartridge interface (such as that found in video game devices), a removable memory chip (such as an erasable programmable read only memory (EPROM), or programmable read only memory (PROM)) and associated socket, and other removable storage units 1522 and interfaces 1520, which allow software and data to be transferred from the removable storage unit 1522 to computer system 1500.

Computer system 1500 may also include a communications interface 1524. Communications interface 1524 allows software and data to be transferred between computer system 1500 and external devices. Examples of communications interface 1524 may include a modem, a network interface (such as an Ethernet card), a communications port, a Personal Computer Memory Card International Association (PCMCIA) slot and card, etc. Software and data transferred via communications interface 1524 are in the form of signals 1528 which may be electronic, electromagnetic, optical or other signals capable of being received by communications interface 1524. These signals 1528 are provided to communications interface 1524 via a communications path (e.g., channel) 1526. This channel 1526 carries signals 1528 and may be implemented using wire or cable, fiber optics, a telephone line, a cellular link, an radio frequency (RE) link and other communications channels.

In this document, the terms "computer program medium" and "computer usable medium" are used to generally refer to media such as removable storage drive 1514, a hard disk installed in hard disk drive 1512, and signals 1528. These computer program products provide software to computer system 1500. The invention is directed to such computer program products.

Computer programs (also referred to as computer control logic) are stored in main memory 1508 and/or secondary memory 1510. Computer programs may also be received via communications interface 1524. Such computer programs, when executed, enable the computer system 1500 to perform the features of the present invention, as discussed herein. In particular, the computer programs, when executed, enable the processor 1504 to perform the features of the present invention. Accordingly, such computer programs represent controllers of the computer system 1500.

In an embodiment where the invention is implemented using software, the software may be stored in a computer program product and loaded into computer system 1500 using removable storage drive 1514, hard drive 1512 or communications interface 1524. The control logic (software), when executed by the processor 1504, causes the processor 1504 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

VI. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method comprising:
    identifying, by a computing system, a first customer account and a second customer account, wherein customer account data lists the first customer account and the second customer account as belonging to different customers;
    conducting, by the computing system, a search of at least one external third-party database to obtain personal identification information associated with the first customer account and the second customer account;
    comparing, by the computing system, the customer account data associated with the first customer account and the second customer account with the personal identification information associated with the first customer account and the second customer account;
    determining, by the computing system, based on the comparing the customer account data with the personal identification information, that the first customer account and the second customer account actually belong to a single customer; and
    associating, by the computing system, the first customer account and the second customer account with an identifier associated with the single customer.

2. The method of claim 1, wherein identifying the first customer account and the second customer account further comprises:
    performing, by the computing system, an analysis of the customer account data and the personal identification information according to a first set of linking rules; and
    creating, by the computing system, a recommendation to link the first customer account with the second customer account based on the analysis, wherein associating the first customer account and the second customer account with the identifier is based on the recommendation.

3. The method of claim 2, wherein identifying the first customer account and the second customer account further comprises:
    performing, by the computing system, a validation of the recommendation according to a second set of linking rules; and
    determining, by the computing system, whether to modify the recommendation based on the validation.

4. The method of claim 1, wherein the conducting the search further comprises:
    generating, by the computing system, a search query based on the customer account data;
    sending, by the computing system, the search query to the external third-party database; and
    receiving, by the computing system, the personal identification information from the external third-party database in response to the search query.

5. The method of claim 1, further comprising:
    identifying, by the computing system, a third customer account wherein the customer account data lists the third customer account as belonging to a different customer from the first customer account and from the second customer account;
    comparing, by the computing system, the customer account data with personal identification information associated with the single customer;
    determining, by the computing system, based on comparing the customer account data with the personal identification information, that the third customer account actually belongs to the single customer; and
    associating, by the computing system, the third customer account with the identifier.

6. The method of claim 1, wherein the personal identification information includes a name of the single customer, a home address of the single customer, a business address of the single customer, a social security number of the single customer, a date of birth of the single customer, a home phone number of the single customer, a business phone number of the single customer, a cell phone number of the single customer, an e-mail address of the single customer, a driver's license number of the single customer, or any combination thereof.

7. The method of claim 1, further comprising, in response to associating the first customer account and the second customer account with the identifier, initiating, by the computing system, consolidation of first customer account data associated with the first customer account with second customer account data associated with the second customer account.

8. The method of claim 1, further comprising, after associating the first customer account and the second customer account with the identifier:
    receiving, by the computing system, a request to modify first customer account data associated with the first customer account; and
    in response to the request, modifying, by the computing system, second customer account data associated with the second customer account.

9. The method of claim 1, wherein comparing the customer account data with the personal identification information comprises:
    detecting, by the computing system, from the personal identification information and from the customer account data, first customer identification information corresponding to the first customer account and second customer identification information corresponding to the second customer account; and determining, by the computing system, whether the first customer identification information matches the second customer identification information.

10. The method of claim 9, wherein comparing the customer account data with the personal identification information comprises:
   detecting, by the computing system, from the personal identification information and from the customer account data, third customer identification information corresponding to the first customer account and fourth customer identification information corresponding to the second customer account; and
   determining, by the computing system, whether the third customer identification information matches the fourth customer identification information.

11. The method of claim 4, wherein the external third-party database includes United States Postal Service data, consumer credit data, marketing data, demographic data, survey data, one or more telephone directories, public record files, court record files, or any combination thereof.

12. An article of manufacture including a non-transitory computer readable medium having instructions stored thereon that, in response to execution by a computer system, cause the computer system to carry out operations comprising:
   conducting a search of at least one external database to obtain personal identification information associated with record data including a first record and a second record;
   comparing the record data with the personal identification information;
   identifying the first record and the second record based on comparing the record data and the personal identification information, wherein the record data lists the first record and the second record as corresponding to different individuals, and wherein the personal identification information indicates that the first record and the second record correspond to a single individual;
   determining that the first record and the second record correspond to the single individual; and
   associating the first record and the second record with an identifier that is associated with the single individual.

13. A system comprising:
   at least one processor; and
   a non-transitory memory having instructions stored thereon that, in response to execution by the at least one processor, cause the system to perform operations comprising:
   conducting a search of at least one external database to obtain personal identification information associated with customer account data including a first customer account and a second customer account;
   comparing the customer account data with the personal identification information;
   determining, based on comparing the customer account data with the personal identification information, that the first customer account and the second customer account actually belong to a single customer, wherein the customer account data lists the first customer account and the second customer account as belonging to different customers; and
   associating the first customer account and the second customer account with an identifier that is associated with the single customer.

14. The article of manufacture of claim 12, wherein the first record corresponds to a first customer account, and wherein the second record corresponds to a second customer account.

15. The article of manufacture of claim 12, wherein the first record and the second record correspond to law enforcement records.

16. The article of manufacture of claim 12, wherein the operations further comprise:
   receiving the first record from a first municipality; and
   generating the second record, wherein the second record corresponds to a second municipality.

17. The system of claim 13, wherein associating the first customer account and the second customer account with the identifier comprises storing the identifier as part of the customer account data associated with the first customer account and the customer account data associated with the second customer account.

18. The system of claim 13, wherein the identifier comprises a persistent ID that is unique to the single customer.

19. The system of claim 13, wherein the personal identification information corresponds to data received based on a communication from the single customer that indicates that the first customer account should be linked with the second customer account.

20. The system of claim 13, wherein the operations further comprise: after associating the first customer account and the second customer account with the identifier, in response to a communication from the single customer that indicates that the second customer account should not be linked to the first customer account, disassociating the second customer account with the identifier.

* * * * *